United States Patent
Ooka

(10) Patent No.: US 10,585,544 B2
(45) Date of Patent: Mar. 10, 2020

(54) INFORMATION PROCESSING APPARATUS AND METHOD FOR OUTPUTTING A HAPTIC GUIDING OPERATION TO A USER

(71) Applicant: SONY MOBILE COMMUNICATIONS INC., Tokyo (JP)

(72) Inventor: Tatsuya Ooka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 407 days.

(21) Appl. No.: 15/405,994

(22) Filed: Jan. 13, 2017

(65) Prior Publication Data

US 2017/0147070 A1 May 25, 2017

Related U.S. Application Data

(63) Continuation of application No. 13/705,469, filed on Dec. 5, 2012, now Pat. No. 9,569,057.

(Continued)

(51) Int. Cl.

| | |
|---|---|
| *G06F 3/048* | (2013.01) |
| *G06F 9/451* | (2018.01) |
| *G06F 3/0485* | (2013.01) |
| *G06F 3/01* | (2006.01) |
| *G06F 3/0484* | (2013.01) |
| *G06F 3/0489* | (2013.01) |
| *G01C 21/20* | (2006.01) |

(Continued)

(52) U.S. Cl.
CPC .............. *G06F 3/048* (2013.01); *G06F 3/016* (2013.01); *G06F 3/0484* (2013.01); *G06F 3/0485* (2013.01); *G06F 9/453* (2018.02); *G01C 21/20* (2013.01); *G01C 21/3652* (2013.01); *G06F 1/1626* (2013.01); *G06F 3/04812* (2013.01); *G06F 3/04895* (2013.01); *G06F 3/04897* (2013.01)

(58) Field of Classification Search
CPC .... G06F 1/1626; G06F 3/016; G06F 3/04812; G06F 9/451; G01C 21/20; G01C 21/3652
See application file for complete search history.

(56) References Cited

U.S. PATENT DOCUMENTS

| | | | |
|---|---|---|---|
| 6,067,502 | A | 5/2000 | Hayashida et al. |
| 6,219,032 | B1 | 4/2001 | Rosenberg et al. |

(Continued)

FOREIGN PATENT DOCUMENTS

| | | |
|---|---|---|
| EP | 1 220 179 A2 | 7/2002 |
| EP | 1 220 179 A3 | 7/2002 |

(Continued)

OTHER PUBLICATIONS

Extended European Search Report dated Feb. 2, 2017 in Patent Application No. 12198158.3.

*Primary Examiner* — Eric J. Bycer
(74) *Attorney, Agent, or Firm* — Xsensus LLP

(57) ABSTRACT

An information processing apparatus that determines a direction to browsed next as a guiding direction with a location of content displayed by a display of the information processing apparatus as a reference location; determines a perceptual strength of each of a plurality of active elements disposed in different locations on or within a casing of the information processing apparatus based on the guiding direction; and controls each of the plurality of active elements based on the perceptual strengths.

20 Claims, 27 Drawing Sheets

Related U.S. Application Data

(60) Provisional application No. 61/583,363, filed on Jan. 5, 2012.

(51) Int. Cl.
*G01C 21/36* (2006.01)
*G06F 3/0481* (2013.01)
*G06F 1/16* (2006.01)

(56) References Cited

U.S. PATENT DOCUMENTS

| | | |
|---|---|---|
| 7,102,635 B2 | 9/2006 | Shih et al. |
| 7,233,316 B2 | 6/2007 | Smith et al. |
| 7,756,636 B2 | 7/2010 | Kikuchi et al. |
| 8,593,409 B1 | 11/2013 | Heubel et al. |
| 8,894,491 B2 | 11/2014 | Grant et al. |
| 2002/0052685 A1* | 5/2002 | Kamiya ............... G01C 21/36 701/408 |
| 2002/0111737 A1 | 8/2002 | Hoisko |
| 2003/0016253 A1* | 1/2003 | Aoki ................. G06F 1/1626 715/863 |
| 2004/0257340 A1 | 12/2004 | Jawerth |
| 2006/0136631 A1 | 6/2006 | Eid et al. |
| 2006/0152497 A1 | 7/2006 | Rekimoto |
| 2007/0236475 A1 | 10/2007 | Wherry |
| 2009/0085882 A1* | 4/2009 | Grant ................. G06F 1/1626 345/173 |
| 2009/0201270 A1 | 8/2009 | Pikkujamsa et al. |
| 2009/0262074 A1 | 10/2009 | Nasiri et al. |
| 2009/0325607 A1 | 12/2009 | Conway et al. |
| 2010/0060604 A1 | 3/2010 | Zwart et al. |
| 2010/0160016 A1 | 6/2010 | Shimabukuro et al. |
| 2010/0169824 A1 | 7/2010 | Sawai et al. |
| 2010/0225756 A1 | 9/2010 | Miyata |
| 2010/0238116 A1* | 9/2010 | Shin ....................... G06F 3/016 345/168 |
| 2011/0163860 A1 | 7/2011 | Ryu et al. |
| 2011/0260996 A1 | 10/2011 | Henricson |
| 2011/0264370 A1 | 10/2011 | Jakobson et al. |
| 2012/0072863 A1 | 3/2012 | Akifusa |
| 2012/0150431 A1 | 6/2012 | Ooka |
| 2013/0201155 A1 | 8/2013 | Wu et al. |
| 2016/0298981 A1 | 10/2016 | Miyata |

FOREIGN PATENT DOCUMENTS

| | | |
|---|---|---|
| EP | 2 228 625 A2 | 9/2010 |
| EP | 2 228 625 A3 | 9/2010 |
| JP | 2001-025510 | 1/2001 |
| JP | 2010-237902 | 11/2010 |

\* cited by examiner

INFORMATION PROCESSING APPARATUS AND METHOD FOR OUTPUTTING A HAPTIC GUIDING OPERATION TO A USER

CROSS REFERENCE TO RELATED APPLICATION

This application is a continuation of application Ser. No. 13/705,469, filed Dec. 5, 2012, now U.S. Pat. No. 9,569,057, which claims the benefit of the earlier filing date of U.S. Provisional Patent Application Ser. No. 61/583,363 filed on Jan. 5, 2012, and the entire contents of each are hereby incorporated by reference.

BACKGROUND

Field of the Disclosure

The present disclosure relates to a personal digital assistant which displays content on a display screen, and specifically relates to a method for guiding a user to a predetermined guiding target location or guiding direction at the time of displaying content which does not fit in the display screen region of a display unit.

Description of Related Art

In recent years, in accordance with multifunction cellular phone terminals called smartphones becoming widespread, there have been increased occasions to view a large-area content having much information amount such as web pages, electronic books (including newspapers, electronic manuals, comics, maps, and so forth) or the like.

In general, though the display screen of a display device equipped with a multifunction cellular phone terminal has increased in size as compared to a conventional cellular phone, this does not mean that a content having a great display size (display area with a general resolution) can be suitably displayed. For example, with a multifunction cellular phone terminal, a web site for PC can be browsed on the display screen thereof using a so-called full browser. However, there may be a case where a content cannot be comfortably browsed such as text being hard to read, operations are not easy, and so forth, due to properties such as screen resolution, touch panel operations, and so forth.

On the other hand, major web sites in particular have worked to narrow down the amount of information to be displayed on a screen at a time for a user's comfortable content browsing, such as modifying the layout of a web page, or enlarging a part of a content, or the like.

However, in the event of displaying a content by enlarging the content, the range of a content portion that can be viewed on the screen is narrowed as to the entire content, which may cause the user to lose sight of which region of the entire content is equivalent to a content portion that the user is now browsing.

Heretofore, there has been proposed a technique wherein with an information processing device which scrolls an object to be displayed by a user performing a tracing operation on a display screen, an operation direction with the start location of the tracing operation as a reference, and operation amount thereof are detected, and the display mode of an operation symbol displayed on the display screen is changed based on these information.

SUMMARY

Incidentally, for example, with a content of which the reading direction is determined within a page beforehand, such as newspapers, comics, and so forth, in a state in which a certain content portion is displayed on a display screen, a user views only one portion of a page. In such a case, the user may not determine whether to subsequently advance reading to which direction. With a conventional technique as described above, it is difficult to handle such a case.

Also, from a content producer's viewpoint there may be a case where it is desired to allow a user to view a device manual or the like in accordance with his/her intended procedure, or in an intended direction. In such a case as well, with a conventional technique as described above, it is not necessarily easy for the user to determine the direction to be viewed.

With regard to this, there is a technique for providing an advice message as to a user's operation procedure. However, this method includes a problem in that providing text information to a user causes the amount of information to be displayed on the screen to increase, which makes the display contents cumbersome and complicated, or makes the browsing region of a content to be narrowed down by the text information to be displayed.

The inventor recognizes, at the time of displaying a content which does not fit within a display screen region, desirability to guide a user to a guiding target location (or direction) within the content without increasing the display information amount of the content nor narrowing down the browning region.

According to an exemplary embodiment, the disclosure is directed to an information processing apparatus that determines a direction to browsed next as a guiding direction with a location of content displayed by a display of the information processing apparatus as a reference location; determines a perceptual strength of each of a plurality of active elements disposed in different locations on or within a casing of the information processing apparatus based on the guiding direction; and controls each of the plurality of active elements based on the perceptual strengths.

DETAILED DESCRIPTION

Description will be made below in detail regarding an embodiment of the present disclosure while referencing the drawings.

The embodiment of the present disclosure is, by implementing active elements which affect on a person's perception other than visual perception (e.g., tactile perception or the like), to guide a user of a personal digital assistant to the browsing direction of a content via this perception. Hereafter, the personal digital assistant will also be referred to as a terminal. "Content" with the present embodiment is assumed to be a content having a great display size so that the entirety cannot be displayed on the display screen of the personal digital assistant.

Figure 1:
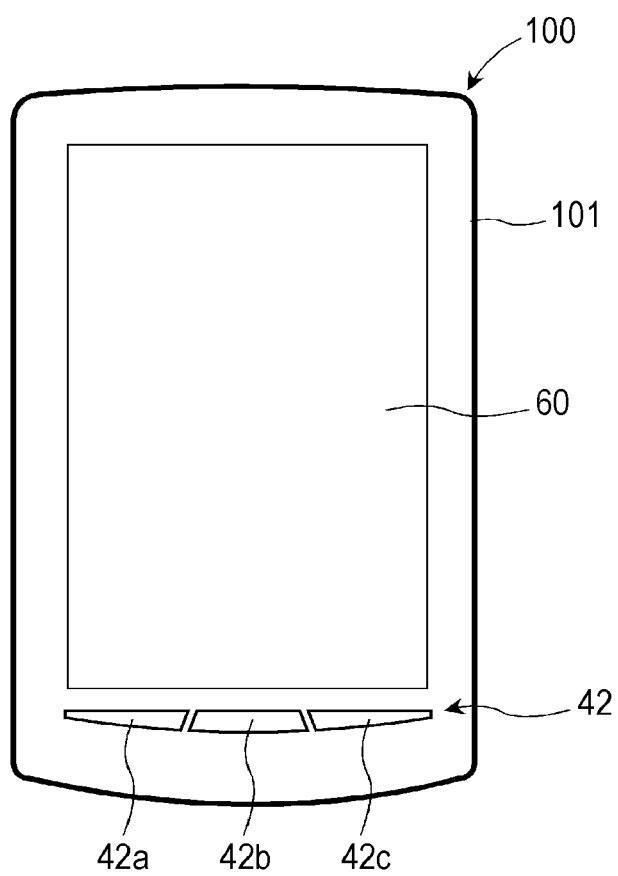
FIG. 1 is a diagram illustrating the external view of the front face of a personal digital assistant according to an embodiment of the present disclosure.

FIG. 1 illustrates the external view of the front face of a personal digital assistant 100 according to an embodiment of the present disclosure. This personal digital assistant 100 is a multifunction cellular phone terminal, for example. However, the personal digital assistant 100 is not restricted to a multifunction cellular phone terminal, and may be an arbitrary terminal device whereby the user can grip by the hand. The display screen of a display unit 60 is represented across most of the entirety of the principal surface of a casing 101 of the personal digital assistant 100. A key operation unit 42 which is a kind of a user operation input unit 40 is disposed in the lower portion of the display screen. The key operation unit 42 includes three input keys 42a, 42b, and 42c in this example.

Figure 2:
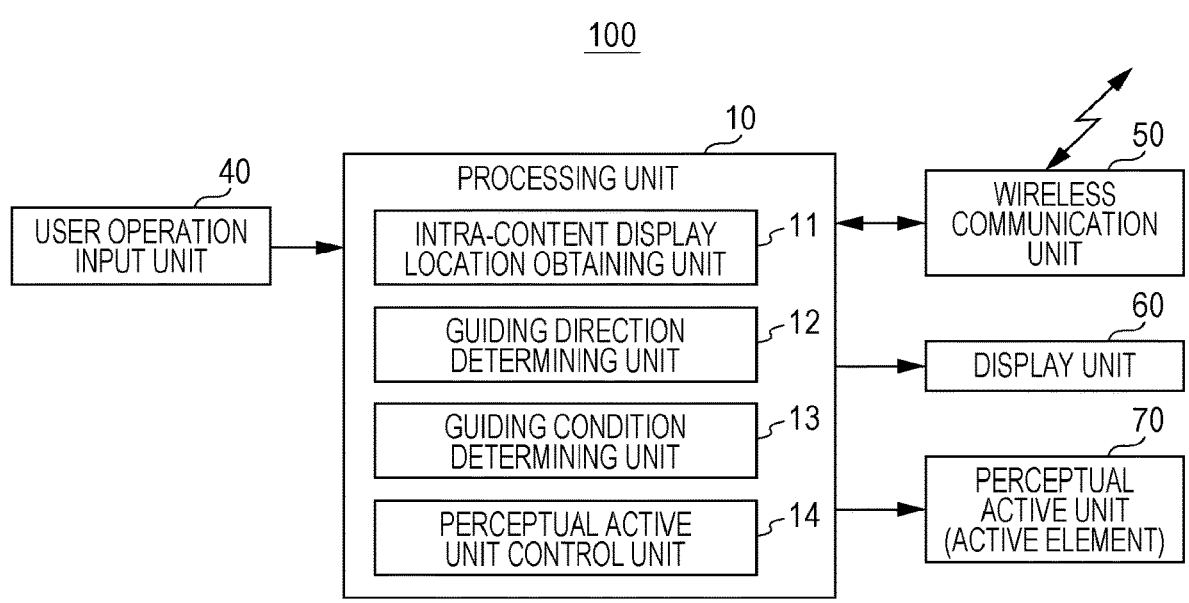
FIG. 2 is a block diagram illustrating the principal functions of a personal digital assistant according to an embodiment of the present disclosure.

FIG. 2 is a block diagram illustrating the principal functions of the personal digital assistant according to the present embodiment.

The personal digital assistant 100 includes a processing unit 10, a user operation input unit 40, a wireless communication unit 50, a display unit 60, and a perceptual active unit 70.

The processing unit 10 includes a central processing unit (CPU), and executes the entire control of the personal digital assistant 100 and necessary processing. More specifically, the processing unit 10 includes an intra-content display location obtaining unit 11, a guiding direction determining unit 12, a guiding condition determining unit 13, a perceptual active unit control unit 14, and so forth as the principal function units according to the present embodiment. The processing that each function unit of these serves bears will be described later.

The user operation input unit 40 is a unit for performing detection of an operation as to the terminal by the user (input of instructions or information, and so forth). The user operation input unit 40 is configured of optional input devices such as operation keys, touch panel, and so forth.

The wireless communication unit 50 is a device for performing wireless communication, and a known communication device such as a cellular phone communication unit (e.g., 3G (3rd Generation), etc.) a wireless LAN (e.g., WiFi, etc.), Bluetooth (registered trademark), or the like can be used as the wireless communication unit 50. A content to be displayed with the present embodiment can be obtained via this wireless communication unit 50. However, a content may be obtained from an external storage device (not illustrated) or the like without passing through the wireless communication unit 50.

The display unit 60 is a display device, for example, such as a liquid crystal display device (LCD: Liquid Crystal Display) or the like, for displaying information such as text, an image, or the like on the display screen so as to be recognized by visual perception, and is supported by the casing 101.

The perceptual active unit 70 is a function unit including at least three active elements disposed in different locations on the casing or within the casing. More specifically, the perceptual active unit 70 is a unit which provides information to the user by taking advantage of the active elements which affect on a person's perception other than visual perception (e.g., tactile perception). The perceptual active unit 70 provides information to the user which grasps the casing via this conception by individually controlling multiple active elements. With the present embodiment, four active elements are disposed in different locations on the casing or within the casing (the four corners of the casing in the present embodiment) as the perceptual active unit 70. The direction of a content portion to be browsed next (i.e., browsing direction) regarding a content portion currently being displayed is informed to the user by driving of these active elements.

The processing of each function unit which the processing unit 10 bears is as follows.

The intra-content display location obtaining unit 11 is a function unit which obtains a guiding target location within a content displayed on the display screen of the personal digital assistant. The guiding target location mentioned here is the location of a guiding destination where the user is guided within the entire content. The intra-content display location obtaining unit 11 is, in the event that all of the regions of a content cannot be displayed within in the display screen region of the display unit 60, a unit for obtaining information representing which portion of the entire content a region being currently displayed on the display screen (content portion) is equivalent to. With the present embodiment, such an intra-content display location is determined with a coordinate point of a predetermined location (e.g., the center location of the display screen region) of a content portion being currently displayed within the display screen region. This coordinate point is a point corresponding to the origin O in the display coordinate system including the entire content.

Examples of a mode for obtaining a guiding target location in the present embodiment are follows.

(a) The guiding target location is determined to be information accompanied with the content along with a predetermined guiding start location within a content determined by a content producer. The guiding start location mentioned here is a location where in the event that a particular location or region has consequently been browsed within the entire region of a displayed content, and automatically or at the time of a predetermined condition being satisfied a guiding operation is started. "In the event that a particular location or region has consequently been browsed" can be determined by the display screen region including the location or region thereof or reaching the location or region thereof along with scrolling of a displayed content by the user's operation.

(b) The guiding target location is set according to the user's operation input.

The guiding direction determining unit 12 is a function unit for determining the direction of a guiding target location as viewed from a location within the display screen region in a state in which the guiding target location is out of the display screen region as the guiding direction. This specific function will be described later.

The guiding condition determining unit 13 is a function unit for determining whether to perform the guiding operation by the perceptual active unit 70 in accordance with a predetermined guiding condition. The guiding condition mentioned here is a condition for determining whether to perform the guiding operation. More specifically, the guiding condition determining unit 13 can take any single of, for example, the following multiple conditions, or multiple combinations.

(a) The guiding target location is to be out of the current display screen region.

(b) The display screen region of a content is to have reached the guiding start location.

(c) The guiding operation is set to have been enabled at initial settings.

(d) An instruction for requesting start of the guiding operation is to have been issued from the user.

The perceptual active unit control unit 14 is a function unit for determining the perceptual strength of each of multiple active elements based on the guiding direction, and controlling the multiple active elements with the perceptual strengths thereof. More specifically, the perceptual active unit control unit 14 is a unit for determining the perceptual strength of each of at least three active elements installed in the casing, and controlling at least the three active elements based on the perceptual strengths.

Figure 3:
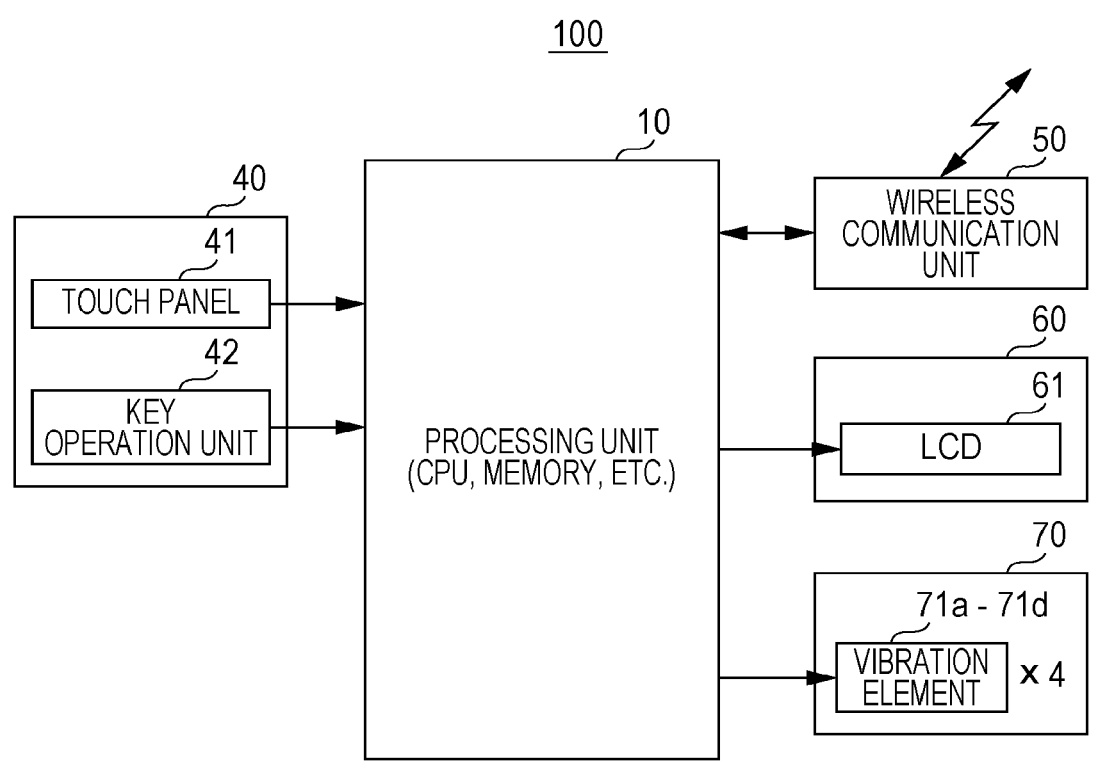
FIG. 3 is a block diagram illustrating a hardware configuration example of the personal digital assistant illustrated in FIG. 2.

FIG. 3 is a block diagram illustrating a hardware configuration example of the personal digital assistant 100 illustrated in FIG. 2.

Description will be made below regarding an example employing, for example, vibration PS (Phantom Sensation) that is a vibration perceptual property as a kind of a person's perceptual properties. The vibration PS mentioned here is a phenomenon wherein in the event of having applied vibration stimulation to multiple points on the skin, the person perceives these at the middle point thereof as one fused vibration, and a location to perceive a fused vibration is also changed by changing the ratios of the vibration strengths. The vibration PS may be induced using electric stimulation.

With the embodiment of the present disclosure, the phenomenon of such vibration PS is used to correspond the location of the vibration PS guided within the palm of the user by four vibration elements disposed in different locations of the casing of the personal digital assistant to a direction where the target terminal exists. Thus, the guiding function of an intuitive content browsing direction is realized.

The processing unit 10 can be configured of, in addition to the above central processing unit (CPU), memory (storage device), input/output devices, and so forth. A program that the CPU executes and various types of data are saved in the memory. The memory is also used as the work region of the CPU, and a temporal saved region for data.

The user operation input unit 40 can be configured of the touch panel 41 and key operation unit 42. The touch panel 41 is a unit for detecting an operation such as tracing the touch panel surface by the user according to change of electrostatic capacity or the like by touch such as the user's finger or the like. For example, scrolling in an arbitrary direction of a displayed content, or the like is performed based on the operation amount thereof. The touch panel 41 preferably includes a touch input area overlapped with the display screen of the display unit 60. The key operation unit 42 can be configured of multiple keys such as a numeric key-pad, control keys, direction instruction keys, and so forth. The key operation unit 42 is not restricted to a hardware key made up of a physical key, and may include a software key displayed on the touch panel 41. Note that, with a multifunction personal digital assistant, the touch panel is a preferable user operation input unit, but with the present disclosure, the touch panel is not an essential component.

A display device, for example, such as the liquid crystal display device (LCD) 61 can be used as the display unit 60. However, the display unit 60 is not restricted to an LCD.

With this example, four vibration elements 71*a* through 71*d* are employed as the active elements making up the perceptual active unit 70. The frequency of the vibration of each vibration element is basically a common predetermined frequency (e.g., around 200 Hz). As for vibration elements in the present Specification, arbitrary devices which generate vibration are employed. Though not particularly restricted, vibration motors, piezoelectric elements, linear actuators, and so forth may be included therein.

With the present embodiment, the perceptual active unit control unit 14 determines the ratios of the vibration strengths of the vibration elements 71a through 71d installed in the four corners of the terminal (casing 101). The vibration strengths of the four vibration elements 71a through 71d are changed based on the determined vibration strength ratio, thereby guiding the vibration PS on the palm of the user who holds the personal digital assistant. A specific example of the vibration strength ratios will be described later.

Though not illustrated, the personal digital assistant 100 may further include components which a common cellular phone terminal includes, such as a speaker for outputting audio signals as sound or voice, a microphone which converts sound and voice into audio signals, and so forth.

Figure 4:
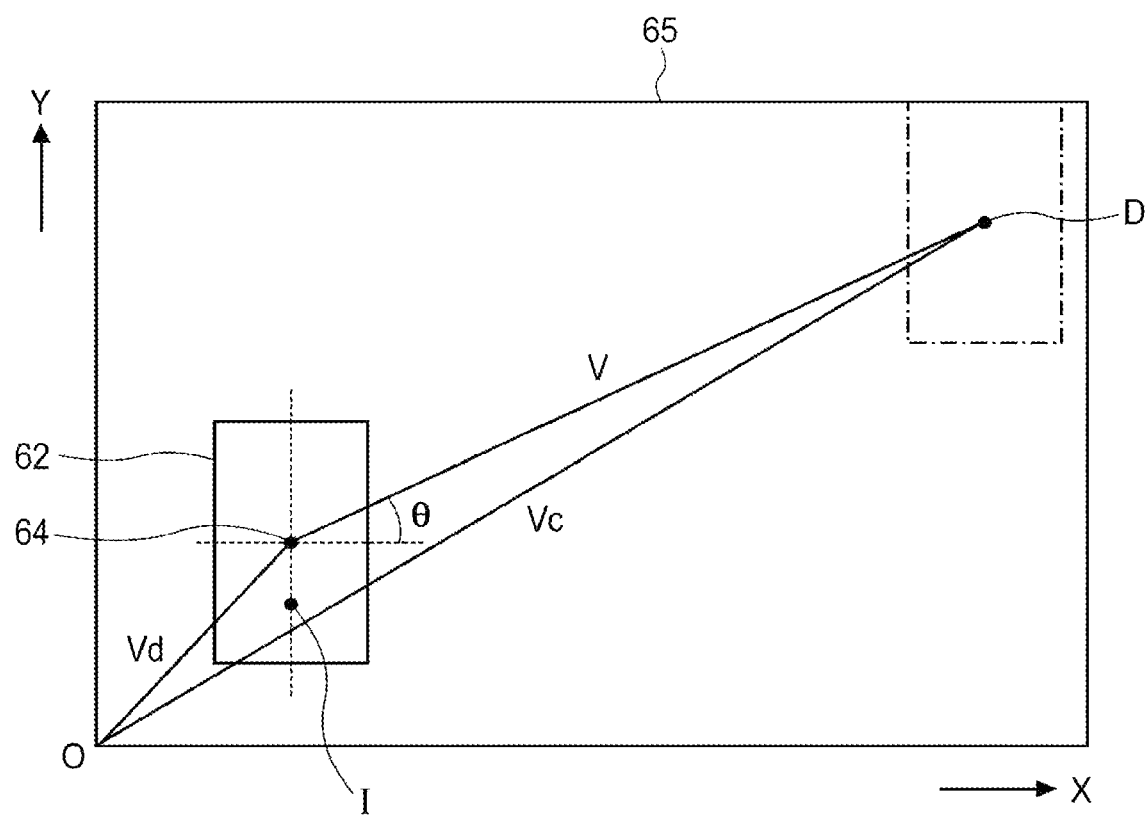
FIG. 4 is a diagram illustrating a relation between the entire region of a content to be provided to a user, a partial region (display screen region) of the content currently displayed on a display screen, and a guiding target location D.

FIG. 4 illustrates a relation between the entire region of a content (content entire region) 65 provided to the user, the region of a content portion (display screen region) 62 being currently displayed on the display screen, and a guiding target location D. For example, a coordinate system is defined wherein, with the left edge lowermost portion of the content entire region 65 as the origin O, the vertical side direction of the content entire region 65 is taken as the vertical axis, and the lateral side direction of the content entire region 65 is taken as the lateral axis. In this case, a vector Vc indicating a guiding target location D within the content from the origin O, and a vector Vd indicating the location (here, center location 64) of the region (display screen region) 62 being currently displayed on the screen from the origin O are determined. A vector V (guiding direction vector) indicting the direction of the guiding target location D as viewed from the center location 64 of the current display screen region 62 is obtained using the vector Vc and vector Vd. Let us say that an angle made up of the guiding direction V and the lateral axis (X axis) of the display coordinate system is taken as θ. Note that in the event that a content has been rotated by the user's operation or the like, let us say that the guiding target location D is rotated with the center location 64 of the display screen region 62 as the center while fixing the display coordinate system. However, the rotational center of the content is not restricted to the center location 64 of the display screen region 62.

With the guiding condition (b) for performing the above guiding operation, as illustrated in FIG. 4, when a guiding start location I is included in the current display screen region 62 of a content, the guiding operation is started.

Ratios v1, v2, v3, and v4 of the vibration strengths of the vibration elements are obtained using an angle θ by the following Expression (1), for example. The v1(θ) through v4(θ) of Expression (1) represent the values of mutual ratios (vibration strength ratios) so that the summation of these becomes 1.

$$v1(\theta)=(1/4)\times\{1+\sin\theta\sin(\pi/4)+\cos\theta\sin(\pi/4)\}$$

$$v2(\theta)=(1/4)\times\{1+\sin\theta\sin(\pi/4)+\cos\theta\sin(\pi/4)\}$$

$$v3(\theta)=(1/4)\times\{1+\sin\theta\sin(\pi/4)+\cos\theta\sin(\pi/4)\}$$

$$v4(\theta)=(1/4)\times\{1+\sin\theta\sin(\pi/4)+\cos\theta\sin(\pi/4)\} \quad (1)$$

Note that it is known that vibration strength, and strength wherein a person perceives vibration have a logarithmic relation instead of a linear relation. Therefore, V1 may be used so that v1(θ)=log (V1) holds. With regard v2(θ), v3(θ), and v4(θ) as well, the corresponding v2, v3, and v4 can be defined.

Figure 5:
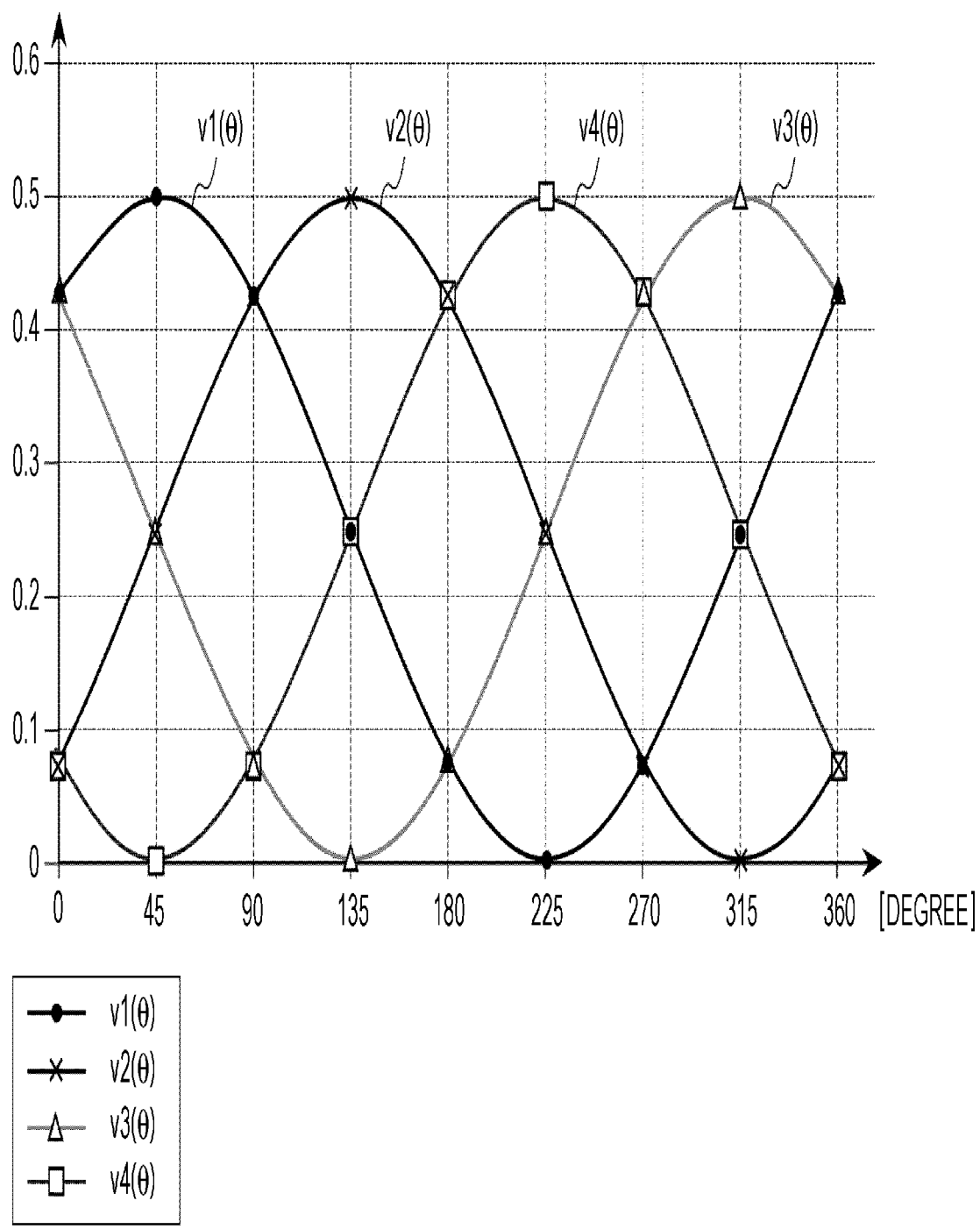
FIG. 5 is a graph representing $v1(\theta)$ through $v4(\theta)$ represented by Expression (1).

A relation between the angle θ and the vibration strengths (vibration strength ratios) of the vibration elements will be described with reference to FIG. 5. FIG. 5 represents the v1(θ) through v4(θ) represented with Expression (1) using a graph. The lateral axis indicates the angle θ, and the vertical axis indicates the magnitude of each of the v1(θ) through v4(θ). The angle θ indicates a range from 0 degree to 360 degrees.

Figure 6:
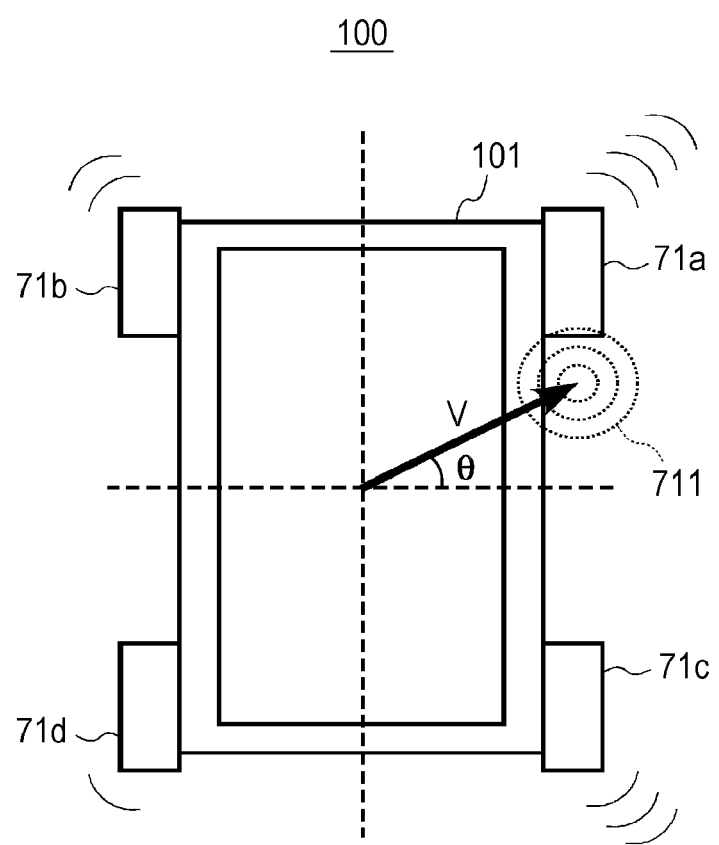
FIG. 6 is a diagram illustrating a relation between an angle $\theta$ of a guiding direction vector, and the location of vibration PS obtained as a fusion result of the vibrations of four vibration strengths disposed in the four corners of a casing.

FIG. 6 illustrates a relation between the above angle θ, and the location of vibration PS 711 obtained as a fusion result of the vibrations of the vibration strengths of the vibration elements in the case of including four vibration elements disposed in the four corners of the casing 101. In this drawing, four vibration elements 71a, 71b, 71c, and 71d making up the perceptual active unit 70 are disposed in the four corners of the casing 101 having a generally rectangular parallelepiped shape of the personal digital assistant 100. In the drawing, the vibration elements are exaggeratingly illustrated in a form protruding from the casing 101. In reality, there is no need to externally protrude in this way.

According to the control of the four vibration elements 71a through 71d based on the values of the v1(θ) through v4(θ), the vibration PS 711 induced by the vibration elements 71a through 71d is obtained. The location of the vibration PS 711 obtained as a fusion result of the vibrations of all of the vibration elements 71a through 71d is perceived by the user. That is to say, this vibration PS 711 is recognized as if only a single vibration element exists in the locations depending on the vibration strengths of the four vibration elements 71a through 71d at the palm of the user holding the personal digital assistant 100.

Figure 7A:
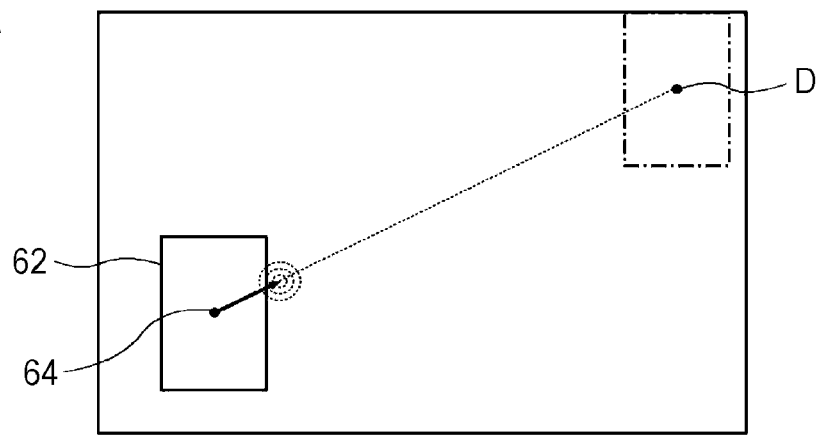
FIGS. 7A-7C illustrate an example of scrolling a display content according to a guiding operation.
Figure 7B:
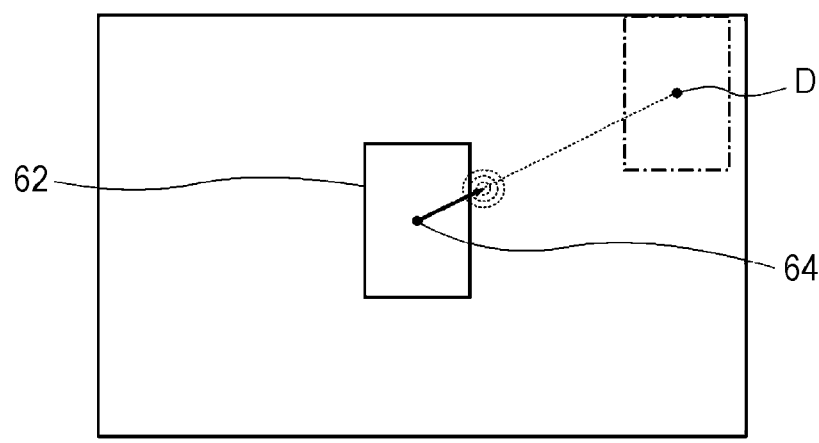
Figure 7C:
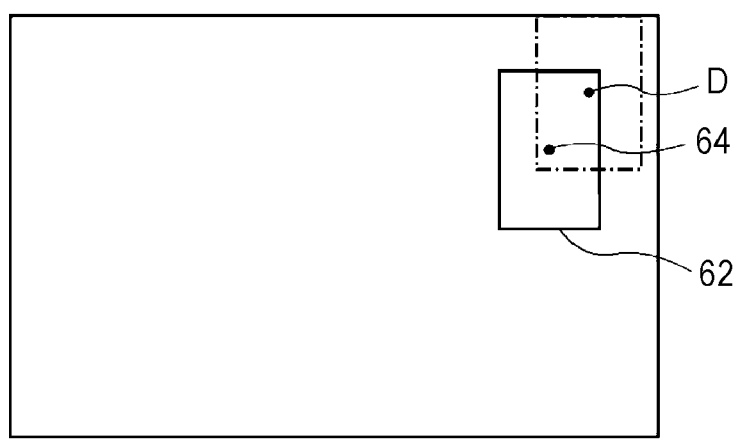

FIG. 7A-7C illustrate an example of scrolling of a display content according to the guiding operation. The content displayed on the display screen region 62 is moved (scrolled) by the user's operation from the user operation input unit 40. The guiding operation can continuously be executed until the display screen region 62 reaches a location including the guiding target location D. Thus, the user can be allowed to recognize the browsing direction using the tactile perception without increasing the display information amount of a content nor narrowing down the substantial display region. In the event that the angle θ has changed during movement, the ratios of the vibration strengths of the four vibration elements 71a through 71d have changed. In such a case as well, the location of the vibration PS within the palm of the user can be moved to the location indicted by the guiding direction.

Note that a known optional operation method can be used for scrolling or an enlargement/reduction operation of a displayed content.

Here, several specific operation examples of the present embodiment will be described.

Figure 8A:
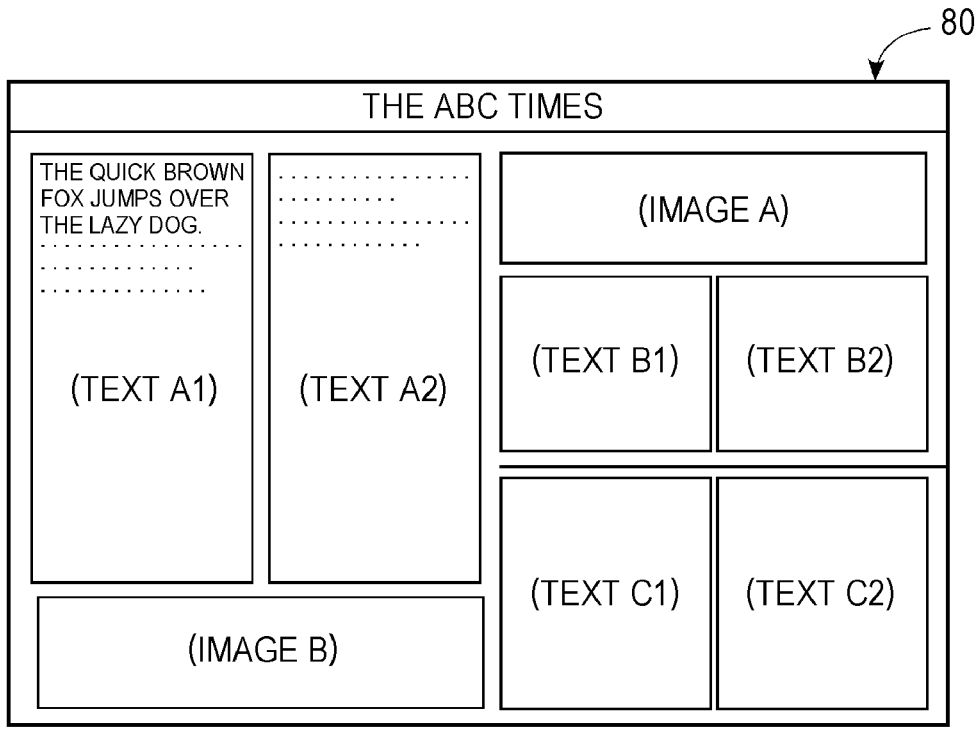
FIGS. 8A-8B illustrate an example of a newspaper as content to be displayed at the personal digital assistant.
Figure 8B:
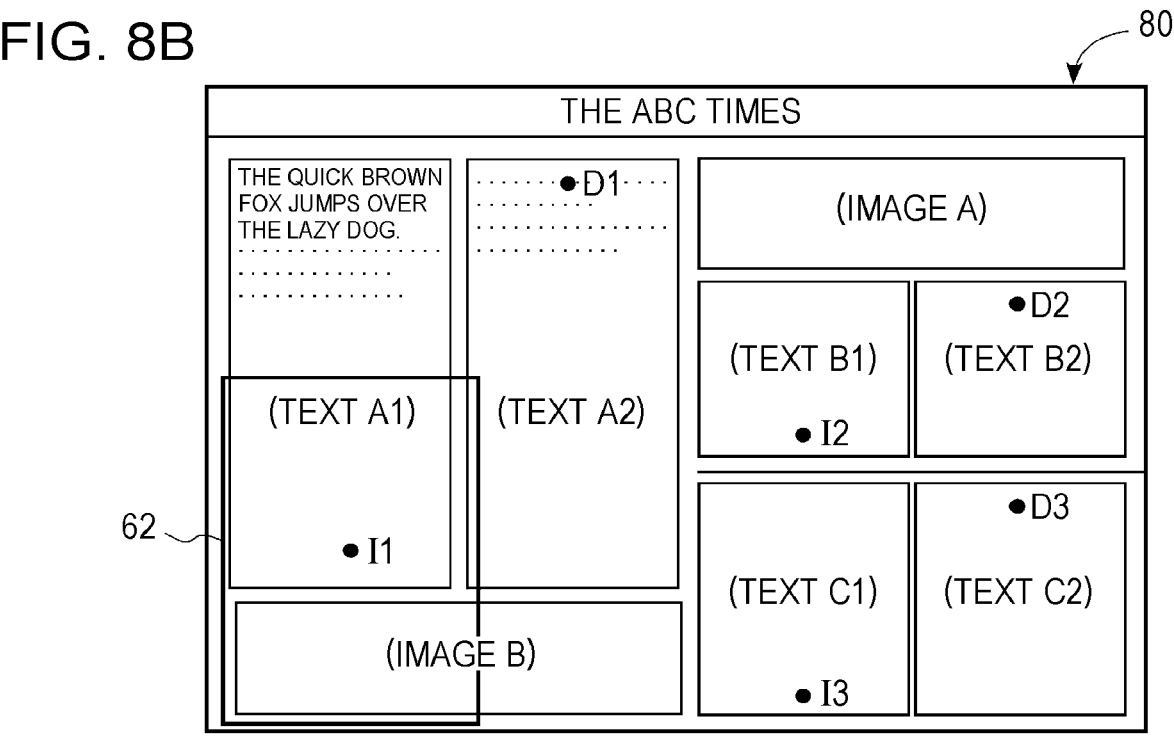

FIGS. 8A and 8B illustrate an example of a newspaper as a content to be displayed on the personal digital assistant. FIG. 8A illustrates the entire region of a newspaper content 80. The flow of one article may be divided by straddling multiple blocks such as columns, tiers, and so forth. In such a case, it may be difficult to determine which direction a continuous content portion exists, from only a content portion being currently displayed. The content producer side can presume such an inconvenience according to the individual articles.

FIG. 8B illustrates guiding start locations I1, I2, and I3 defined with accompanied information added to the newspaper content 80 in FIG. 8A, and guiding target locations D1, D2, and D3 corresponding to these respectively. Such accompanied information is prepared by the producer of the newspaper content 80 beforehand, and is transmitted along with the newspaper content 80. The guiding start location I1 and guiding target location D1 are a pair of data, and a location to be browsed next is the guiding target location D1 when the user's browsing reaches the guiding start location I1. For example, as illustrated in FIG. 8B, in the event that the display screen region 62 is in a location including the guiding start location I1, and also the corresponding guiding target location D1 is in the outside of the display screen region 62, the guiding operation to the guiding target location D1 is started. This can be applied to the guiding start locations I2 and I3, and the corresponding guiding target locations D2 and D3. Thus, in the event that continuous text straddles multiple blocks, when moving from a certain location in a certain block (e.g., lower edge) to another location of another block other than the display screen region (e.g., upper edge), the user can be guided to a correct direction.

Though this example illustrates an example of an English paper, the language may be any language. The described direction of a text string may differ depending on languages such as right from left, left from right, or up from down. Accordingly, the direction to be guided may differ.

Figure 9:
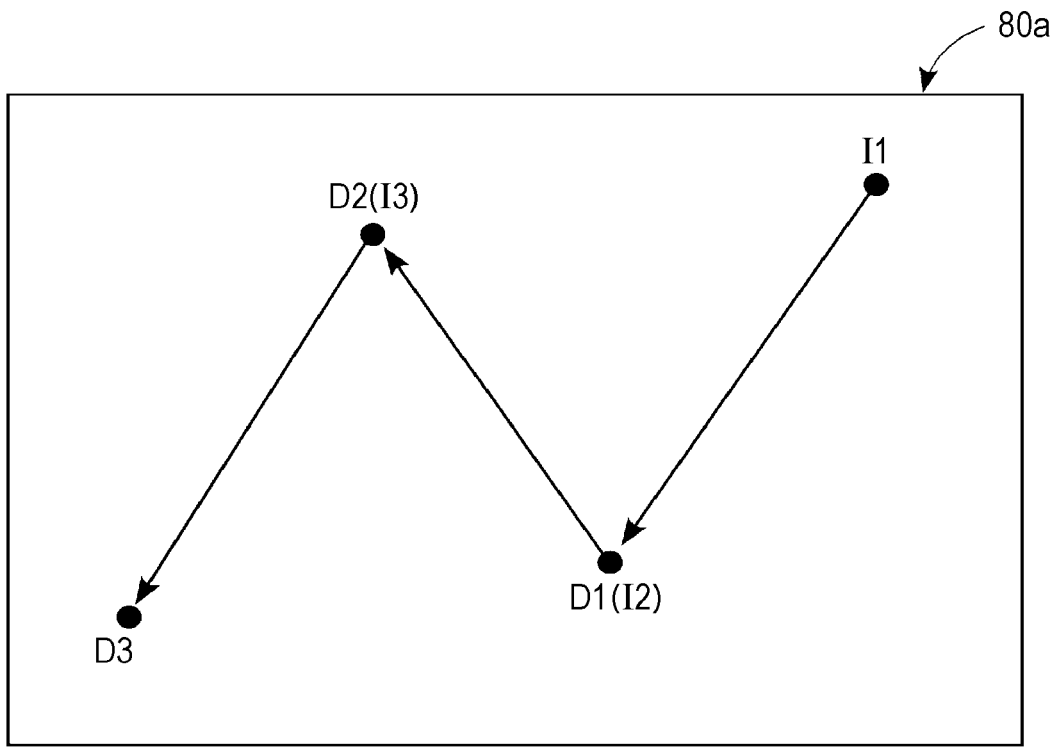
FIG. 9 is a diagram illustrating an example for guiding a user to browse multiple portions within a content in a predetermined order or direction.

Even in the event that text is not divided by a column or tier, in the event of guiding the user to browse multiple locations within a content in a predetermined sequence or direction as well, the present embodiment can be employed. In such a case, the guiding target location corresponding to a certain guiding start location can additionally serve as the guiding start location of the next guiding operation. With the example of the content 80a illustrated in FIG. 9, the guiding target location D1 corresponding to the guiding start location I1 additionally serves as the guiding start location I2 of the next guiding operation. The guiding target location D2 corresponding to the guiding start location I2 additionally serves as the guiding start location I3 of the next guiding operation. In the event of guiding the user to return to the first guiding start location I1 from the last guiding target location D3, an arrangement may be made wherein the guiding target location D3 is taken as further a guiding start location, and the first guiding start location I1 is taken as the guiding target location.

Note that, though the guiding start locations I1, I2, and I3 are illustrated with points, the guiding start locations I1, I2, and I3 may be defined with a part of regions of the entire region of the content 80, or divided regions obtained by dividing the entire region. In such a case, for example, it can be taken as a start condition of the guiding operation that a particular location (e.g., center point 64) within the display screen region 62 enters the corresponding portion region of the content 80. The guiding operation according to the present embodiment can be employed in such a case.

Figure 10:
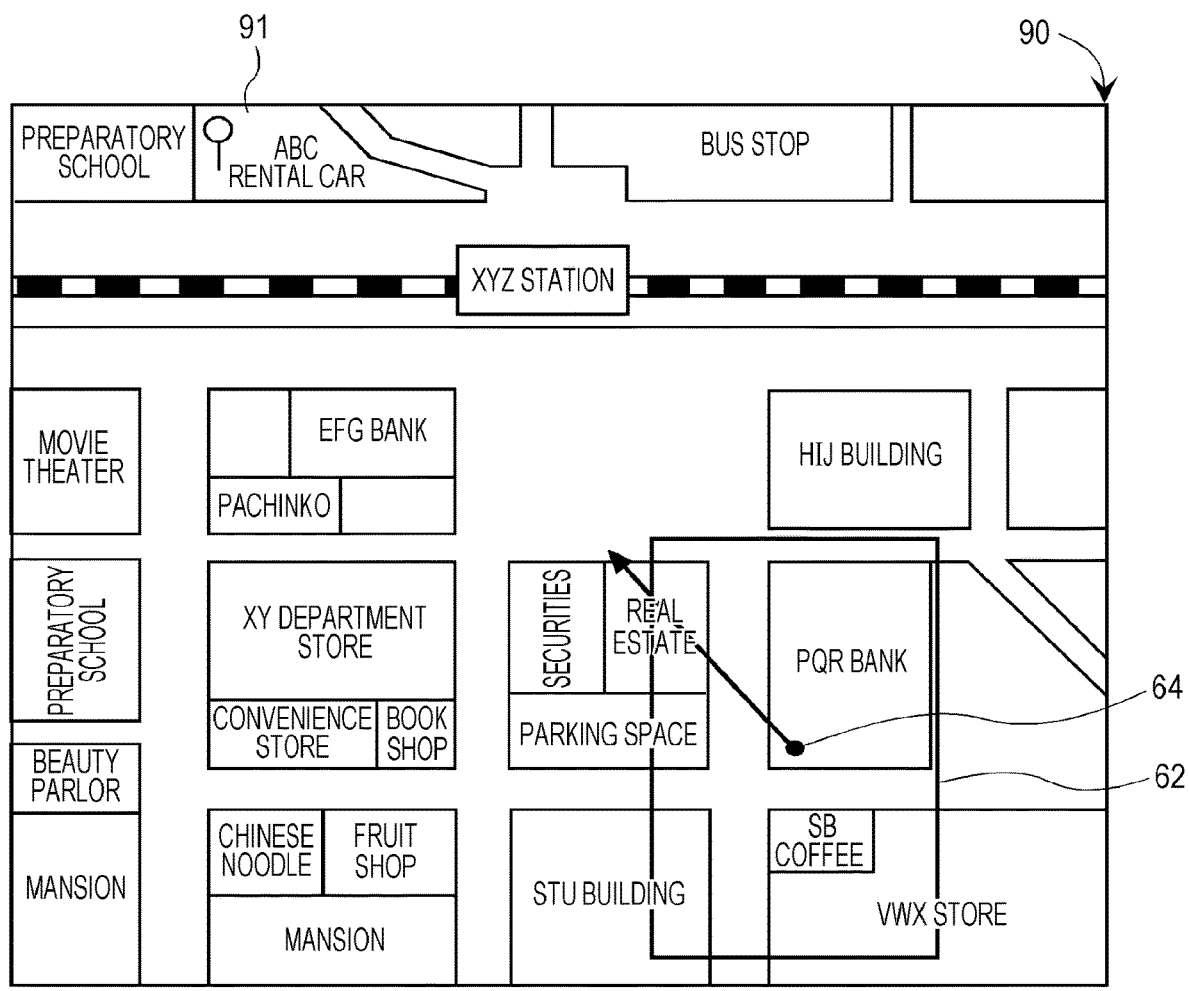
FIG. 10 is a diagram indicating a part of a map content as content to be displayed at the personal digital assistant.

FIG. 10 illustrates a portion of a map content 90 as a content to be displayed at the personal digital assistant. For example, with an application employing a map, in the event that a target location such as facilities or the like has been searched as a common operation example, a map with the location thereof as the center is displayed within the display screen region. At this time, the personal digital assistant temporarily sets (saves) the destination location of a hit search result as the guiding target location. Thereafter, the user may scroll the screen from such a state to search the surrounding facilities or places or the like. At this time, the destination location serving as this search object may deviate from the display screen region. In such a case, though it is desired to return to a location 91 that is the original search result, the direction may not be determined.

With an example of the map illustrated in FIG. 10, let us say that "ABC RENTAL CAR" on the upper left in the drawing is searched for example, the map content 90 is displayed with a location 91 thereof as the center, and a display screen region 62 is then scrolled to the lower right in the drawing as illustrated in the map. At this time, the location 91 that is the guiding target location deviates from the display screen region 62. Therefore, the guiding operation is activated so as to guide the user to the direction of the location 91. This guiding operation may be activated with it as a condition that the guiding target location thereof deviates from the display screen region 62 after an guiding target location is set. Also, it may be taken as an additional condition that the guiding target location simply not only deviates from the display screen region 62 but also separates from the display screen region 62 by predetermined distance or more. Further, in addition to such a condition, the guiding operation may be activated with the guiding start operation of a predetermined user as an additional condition.

Figure 11:
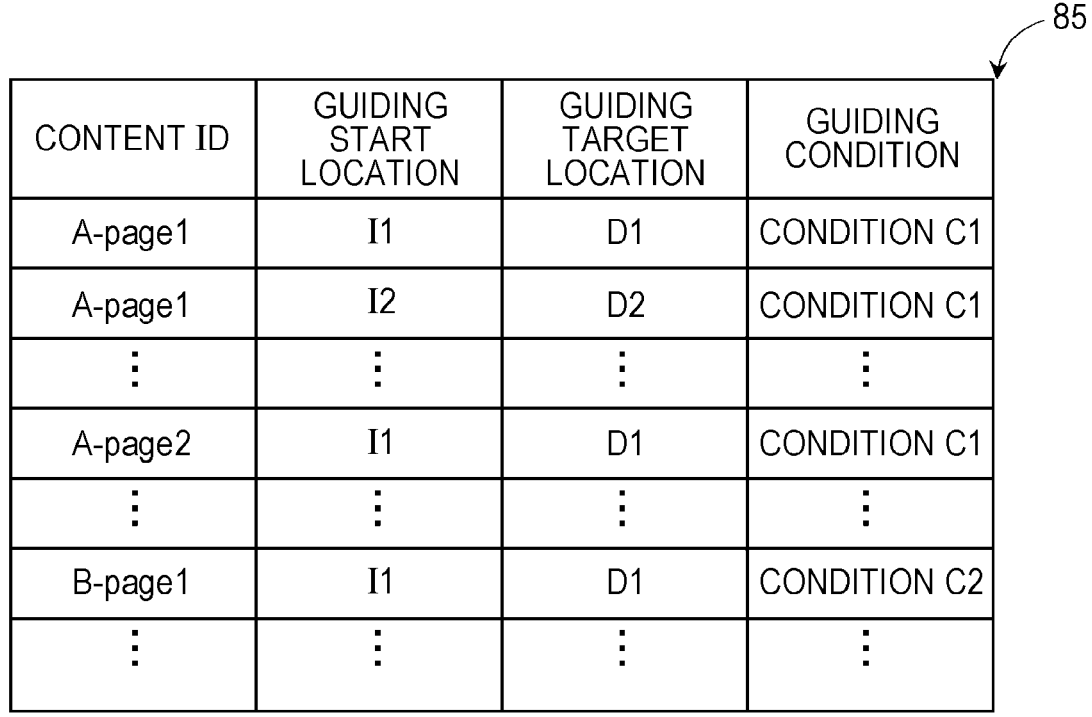
FIG. 11 is a diagram indicating an example of guiding related information according to an embodiment.

FIG. 11 illustrates an example of an guiding related information 85 for determining what kind of guiding operation is performed for each content. This guiding related information 85 is at least data to be temporarily saved at the time of displaying a content. Though the guiding related information 85 is indicated with a data table format for convenience, the data format is optional. The guiding related information 85 includes the items of a content ID that is data for identifying a content, a pair of a guiding start location and a guiding target location, and a guiding condition. The content ID may further include the identification information of a page regarding a content having multiple pages. In the event of the guiding related information 85 being created regarding only one page of one content, the item of "content ID" may be omitted. "Guiding start location" is a particular coordinate point or area within the display coordinate system of the entire content. The item of "guiding start location" may not exist. The item of "guiding condition" may be omitted in the event that a predetermined fixed portion alone is embedded in a program. Also, let us say that in the event that a content has been rotated by the user's operations or the like, the guiding start location and guiding target location within the guiding related information 85 have been changed as appropriate in accordance with rotation of the content with the display coordinate system as a reference.

As for the guiding related information 85 corresponding to the content 80 such as the newspaper described in FIG. 8, the "guiding start location" and "guiding target location" thereof are obtained by the personal digital assistant as accompanied information added to or included in the content 80. "Guiding condition" for performing the guiding operation is that the guiding target location is other than the current display screen region 62, and also the guiding start location is included in the current display screen region 62 of the content 80. This can be applied to the content 80a described in FIG. 9.

With the content 90 such as the map described in FIG. 10, the "guiding start location" thereof is set according to the user's operation input (search operation in this example). "Guiding start location" is unnecessary, and accordingly not set. As for "guiding condition", in response to activation of this application for displaying the map, a condition to the effect that the guiding target location is other than the current display screen region 62 is set. The above distance condition may be set as an additional condition. The guiding operation accompanied with such a search operation may be used for a content other than a map, for example, such as text or PDF documents or the like.

Description will be made regarding a processing example that the personal digital assistant executes for realizing the guiding operation of the above embodiment.

Figure 12:
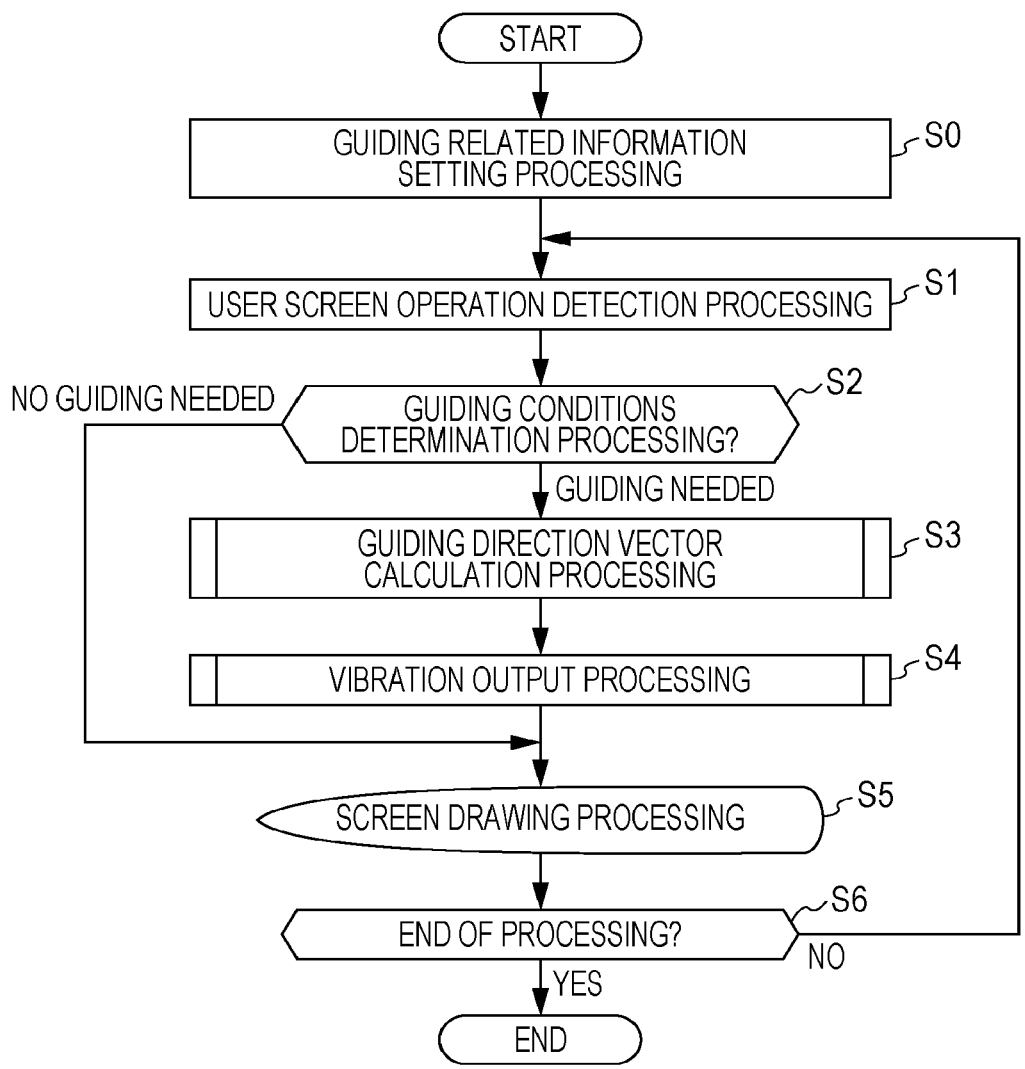
FIG. 12 is a flowchart illustrating a schematic processing procedure of a guiding operation.

FIG. 12 is a flowchart illustrating a schematic processing procedure of the guiding operation. This processing procedure is realized by the processing unit 10 illustrated in FIG. 2 executing a computer program.

In guiding related information setting processing S0, prior to display of a content, or at the time of displaying a content, the guiding related information 85 as described in FIG. 11 is set according to the content thereof or an application for displaying the content thereof. Which item of the guiding related information 85 is saved differs depending on this content or application. An empty data table may simply be created in some cases.

Next, in user screen operation detection processing S1, the user's touch panel operation or key input has been detected, and the drawing range of a content to be displayed on the display unit 60 is changed according thereto.

Therefore, in accordance with the determination condition set to the guiding related information 85 or a fixed determination condition, determination is made regarding whether or not the guiding operation is necessary (S2).

In guiding direction vector calculation processing S3, according to the guiding direction determining unit 12, a guiding direction vector V indicating the direction of the guiding target location as viewed from the location of the current display screen region is calculated using a vector Vc indicating the guiding target location of a content from the origin O, and a vector Vd indicating the location of the display screen region being currently displayed from the origin O.

In vibration output processing S4, an angle θ made up of this vector V, the guiding direction determined at the guiding direction determining unit 12, and the lateral axis X of the display coordinate system is obtained, and the vibration strength ratios of the four vibration elements are calculated. The vibration elements are controlled according to the vibration strength ratios thereof.

In screen drawing processing S5, drawing processing of a content is executed, and the drawing result is output to the display unit 60.

In end processing S6, determination is made regarding whether there has been an end operation by the user. This end operation may include change of a content, end of display, change of initial setting contents, forced termination, and so forth. In the event that there has been no end operation, the flow returns to the user screen operation detection processing S1 again, and the above processing is repeated.

Figure 13:
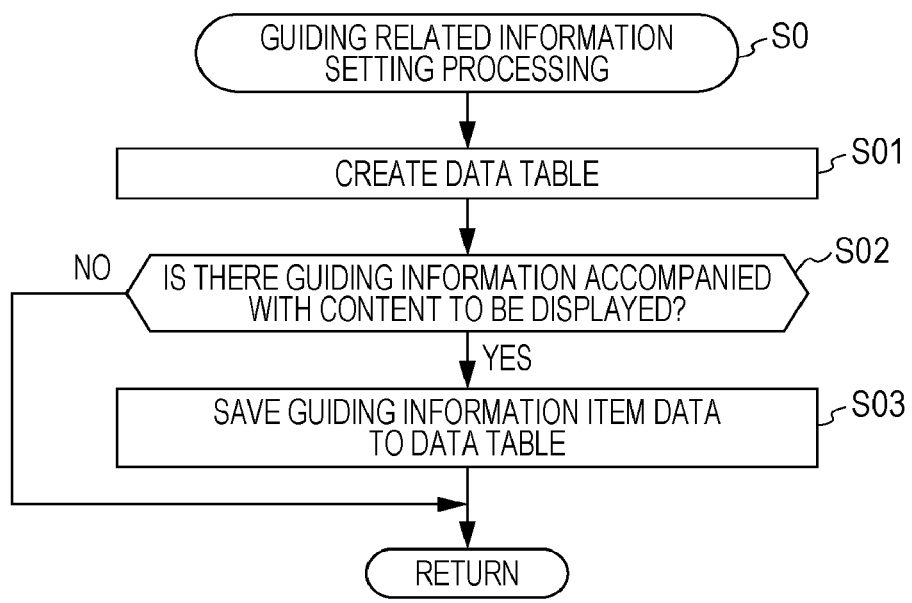
FIG. 13 is a flowchart illustrating a specific processing example of the guiding related information setting processing S0 illustrated in FIG. 12.

FIG. 13 illustrates a specific processing example of the guiding related information setting processing S0 illustrated in FIG. 12.

With this processing example, a data table for saving the guiding related information 85 as described in FIG. 11 is first created (S01). Next, confirmation is made regarding whether or not there is guiding information accompanied with a content to be displayed (S02). In the event that there is no guiding information, this processing is ended. In the event that there is guiding information, the item data of the corresponding guiding information is saved in the data table (S03).

Figure 14:
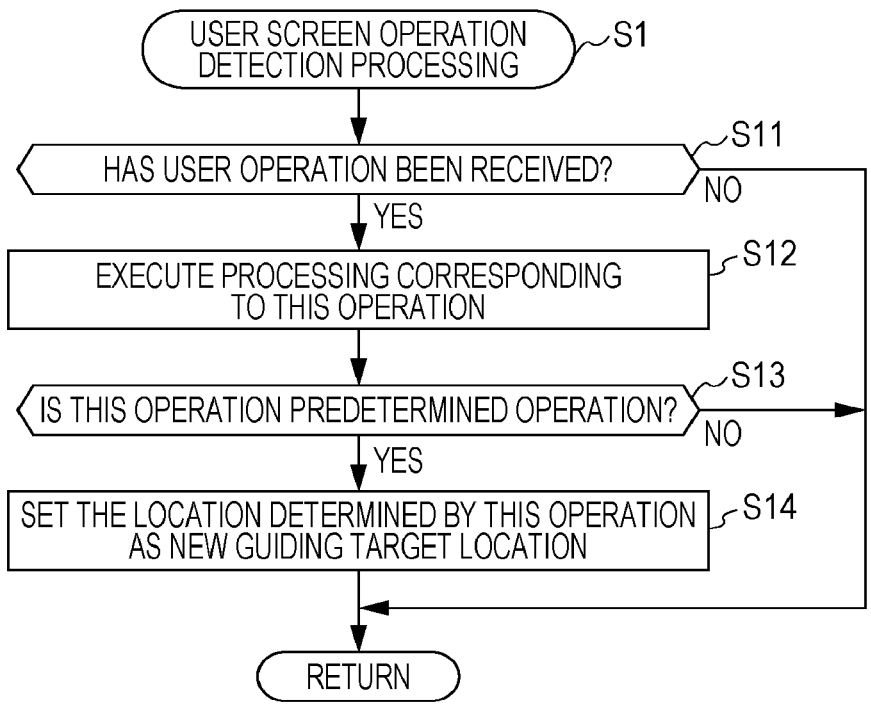
FIG. 14 is a flowchart illustrating a specific processing example of the user screen operation detection processing S1 illustrated in FIG. 12.

FIG. 14 illustrates a specific processing example of the user screen operation detection processing S1 illustrated in FIG. 12.

With this processing example, whether or not there has been the user's operation as to the user operation input unit 40 is monitored (S11), and in the event that there has been such a user's operation, the flow proceeds to the following processing steps.

In the event of having detected the user's operation, processing according to the operation thereof is executed (S12), and also confirmation is made regarding whether or not this processing corresponds to a predetermined operation (S13). This is equivalent to a case where a predetermined operation has been performed such as a search processing operation in the above predetermined application. In the event that this processing corresponds to such a predetermined operation, the location above the content determined by the operation thereof is set as a new guiding target location (S14). In the event that the old guiding target location exists, this is updated overwritten with the new guiding target location.

Figure 15:
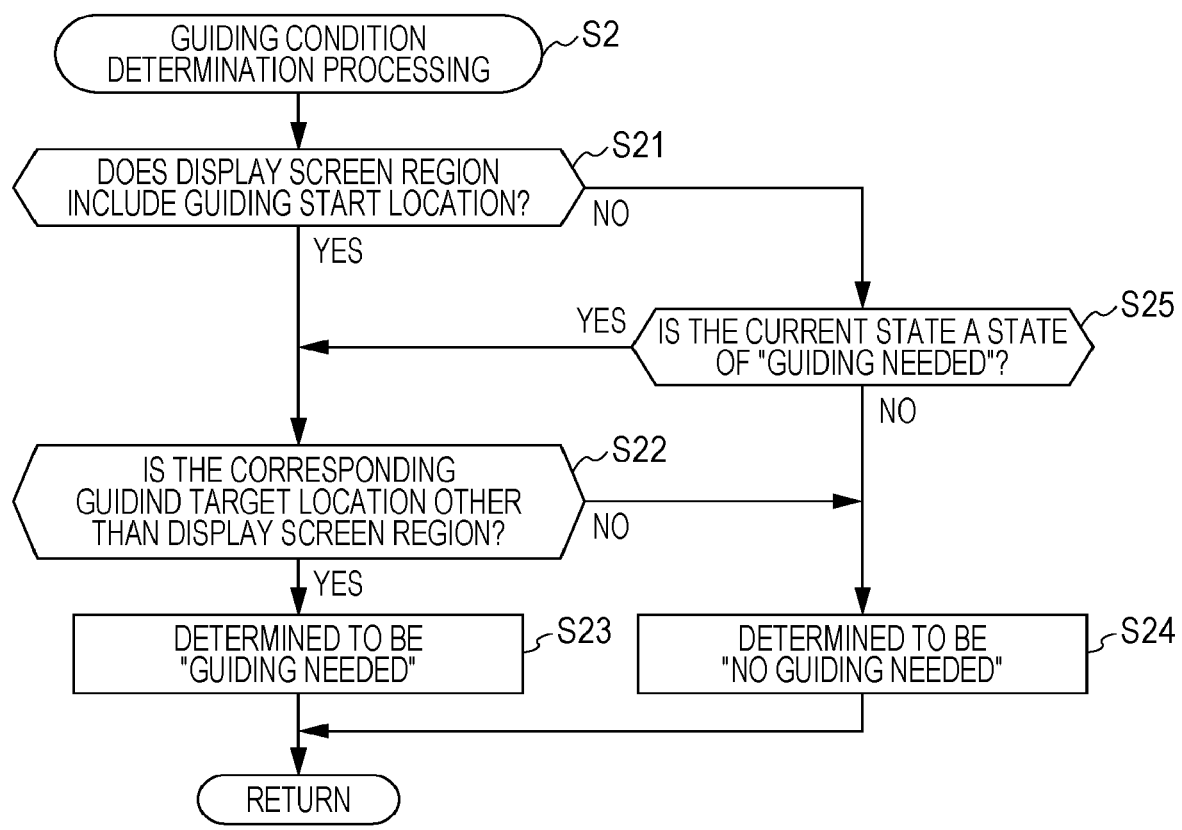
FIG. 15 is a flowchart illustrating a specific processing example of the guiding condition determination processing S2 illustrated in FIG. 12.

FIG. 15 illustrates a specific processing example of the guiding condition determination processing S2 illustrated in FIG. 12. This processing example is equivalent to a case where the guiding start location and guiding target location as described in the above newspaper content have been determined.

First, confirmation is made regarding whether or not the current display screen region includes the guiding start location (S21). In the event that the confirmation result is Yes, confirmation is made regarding whether or not the guiding target location corresponding to this guiding start location is other than the display screen region (S22). In the event that this confirmation result is Yes, this is determined to be "guiding needed" (S23), and the present processing is ended. In the event that the confirmation result in step S21 is No, confirmation is made regarding whether or not the current state is "guiding needed" (S25). In the event that this confirmation result is No, this is determined to be "no guiding needed" (S24), and the present processing is ended.

In the event that the confirmation result in step S25 is Yes, the flow proceeds to step S22. The reason why there is step S25 is as follows. This is, for example, as illustrated in FIG. 7B, to continue the guiding operation in the event that the guiding target location D is still other than the display screen region, i.e., browsing has not reached the guiding target location D even after the display screen region 62 deviated from the guiding start location on the lower left of the screen. However, step S25 is not essential in the present disclosure as described later.

Figure 16:
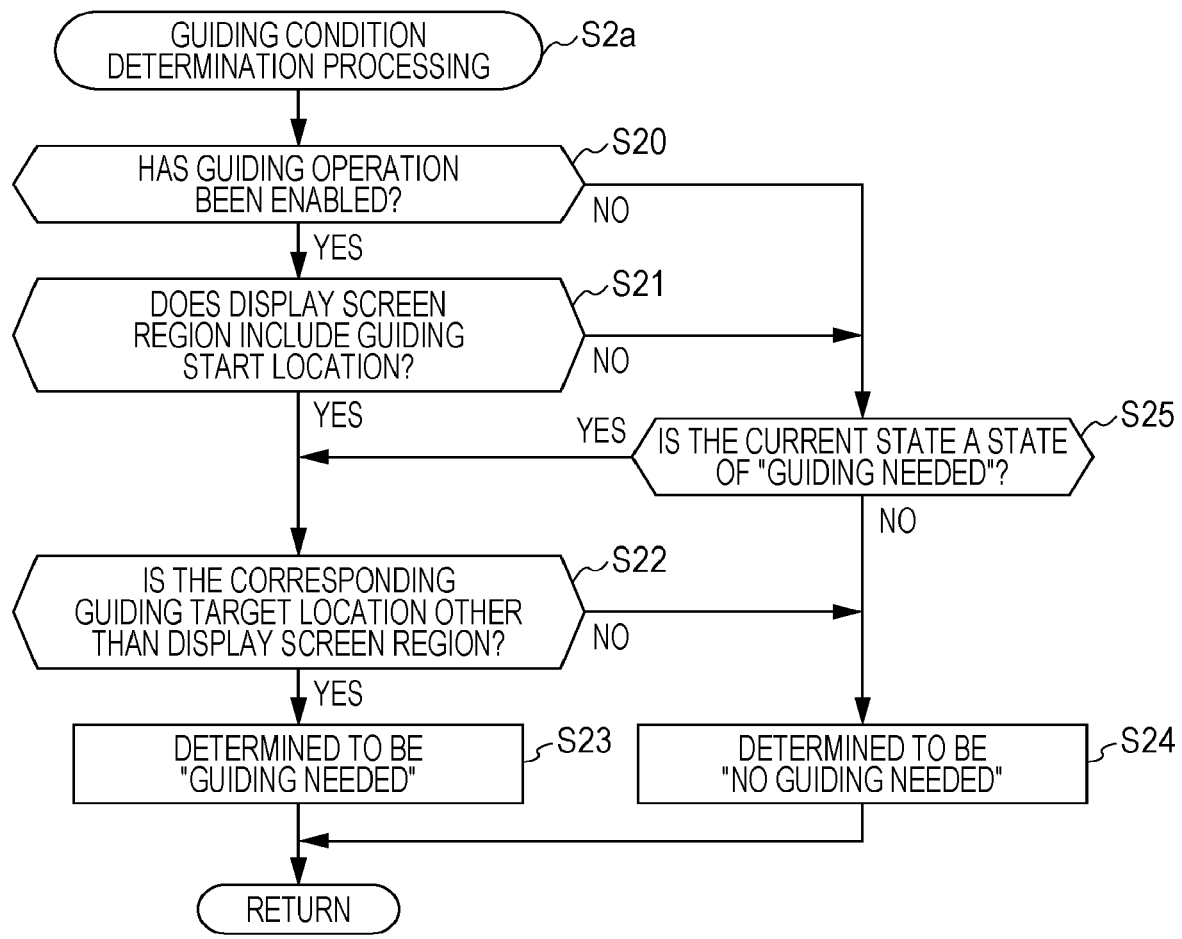
FIG. 16 is a flowchart illustrating guiding condition determination processing S2a serving as a modification of the processing in FIG. 15.

FIG. 16 illustrates guiding condition determination processing S2a serving as a modification of the processing in FIG. 15. The same processing steps as illustrated in FIG. 15 are denoted with the same reference numerals, and redundant description will be omitted. A point different from the processing example in FIG. 15 is that step S20 is added first. In step S20, confirmation is made regarding whether or not the guiding operation has been enabled. For example, this is to handle a case where the user can set beforehand whether to use the guiding operation at the time of displaying a content using the initial setting or the like of the personal digital assistant. The guiding operation according to the present embodiment may be sensed to be troublesome by the user or depending on the situation. Therefore, according to addition of step S20, the guiding operation can be executed only in the event that the guiding operation has been enabled by the settings of the user.

Figure 17:
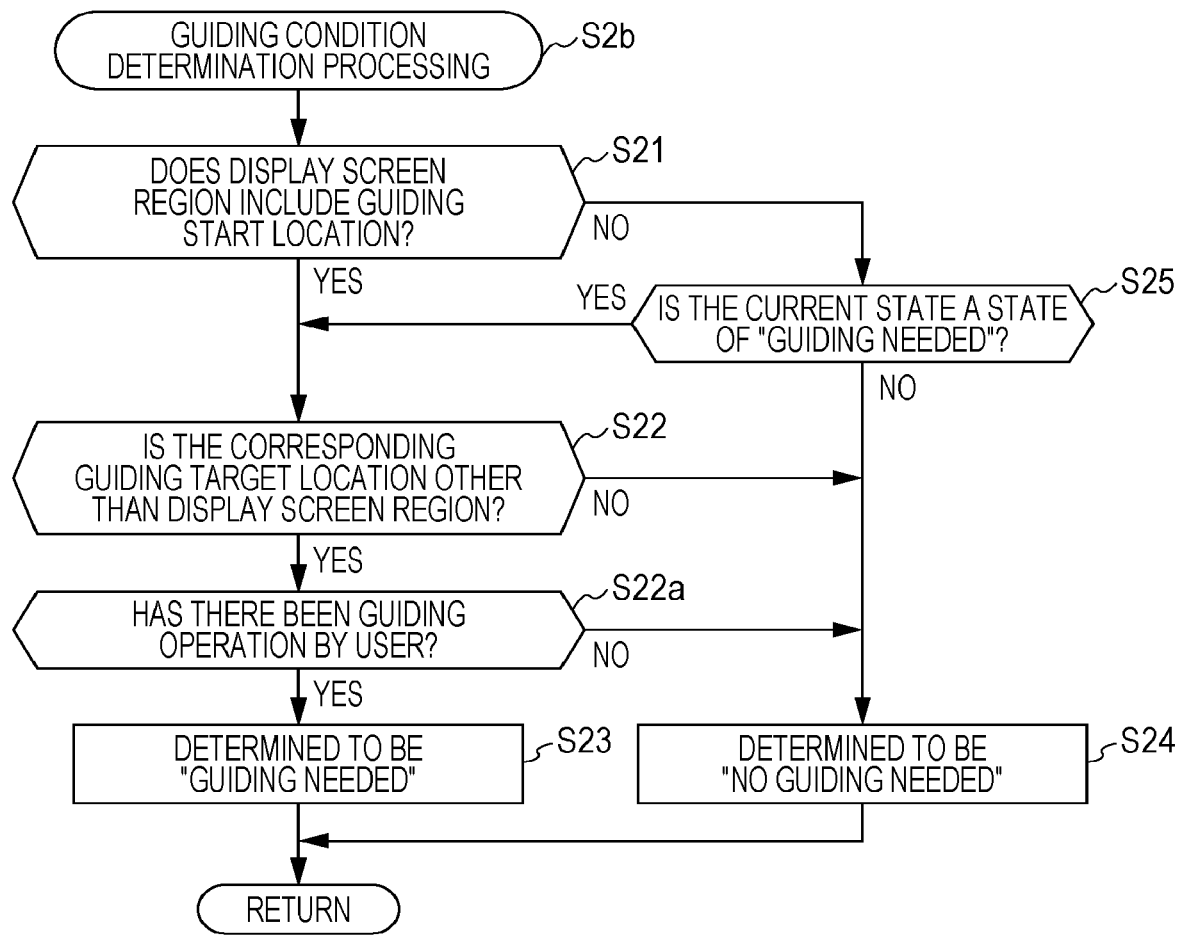
FIG. 17 is a flowchart illustrating guiding condition determination processing S2b serving as another modification of the processing in FIG. 15.

FIG. 17 illustrates guiding condition determination processing S2b serving as another modification of the processing in FIG. 15. The same processing steps as illustrated in FIG. 15 are denoted with the same reference numerals, and redundant description will be omitted. A point different from the processing example in FIG. 15 is that step S22a is added after step S22. In step S22a, confirmation is made regarding whether or not the guiding operation has been requested from the user. With this modification, even in the event that "guiding needed" is determined in the processing in FIG. 15, "guiding needed" is determined only in the event that there has been received the user's explicit instructions. The instructions are issued from the user's predetermined operation as to the user operation input unit 40.

Similarly, step S22a in FIG. 17 may also be added to the guiding condition determination processing S2a in FIG. 16.

Figure 18:
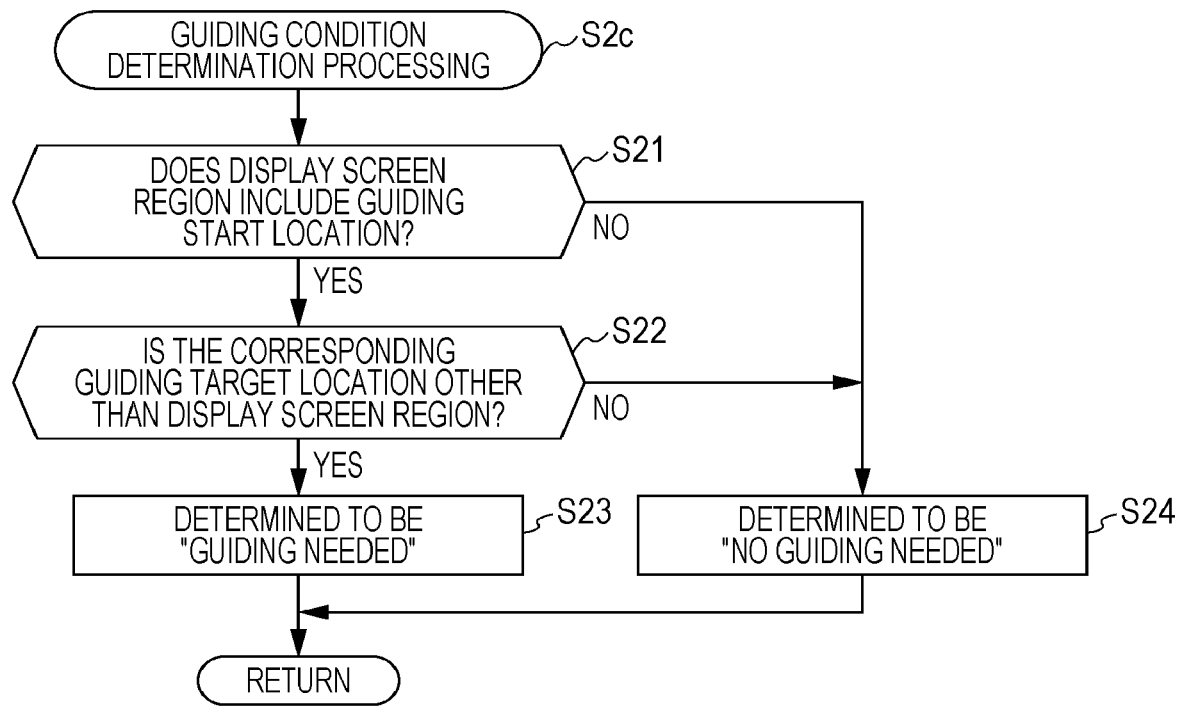
FIG. 18 is a flowchart illustrating guiding condition determination processing S2c serving as yet another modification of the processing in FIG. 15.

FIG. 18 illustrates guiding condition determination processing S2c serving as a further another modification of the processing in FIG. 15. The same processing steps as illustrated in FIG. 15 are denoted with the same reference numerals, and redundant description will be omitted. A point different from the processing example in FIG. 15 is that step S25 has been omitted. For example, even in the event that after the display screen region deviated from the guiding start location, guiding has stopped in a state in which browsing has not reached the guiding target location, the user can reach the guiding target location in the event of continuing movement to the guiding direction first indicated. From this viewpoint, with the present processing example, continuous execution of the guiding operation in such a situation is omitted. Power consumption can be suppressed by stopping guiding.

Figure 19:
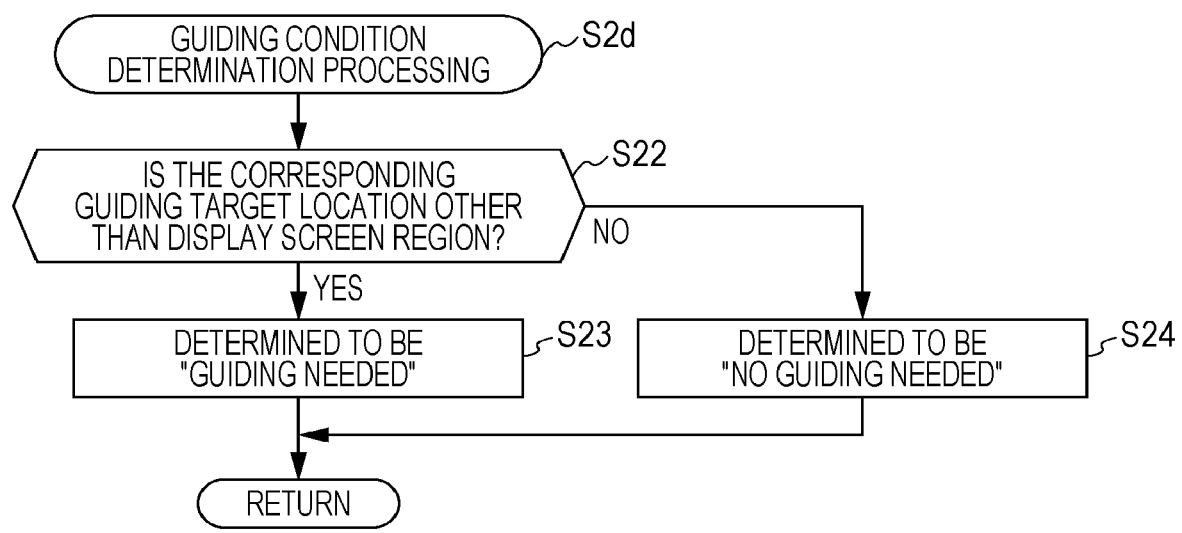
FIG. 19 is a flowchart illustrating guiding condition determination processing S2d serving as another modification of the processing in FIG. 15.

FIG. 19 illustrates guiding condition determination processing S2d serving as another modification of the processing in FIG. 15. The same processing steps as illustrated in FIG. 15 are denoted with the same reference numerals, and redundant description will be omitted. A point different from the processing example in FIG. 15 is that step S21 has been omitted. This processing is for handling an operation example as described with the map content illustrated in FIG. 10.

Similarly, with the processing examples illustrated in FIG. 16 and FIG. 17 as well, step S21 may be omitted.

Figure 20:
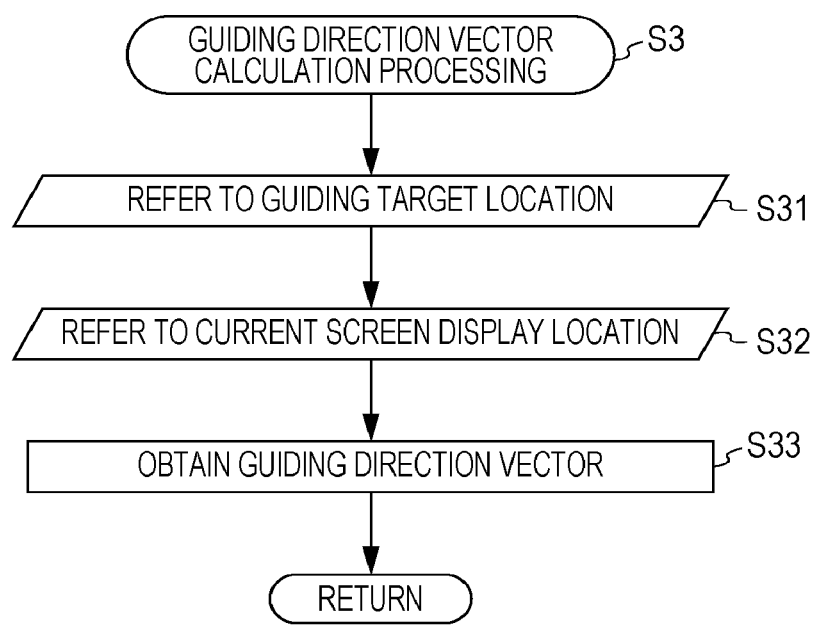
FIG. 20 is a flowchart illustrating a specific processing example of the guiding direction vector calculation processing S3 illustrated in FIG. 12.

FIG. 20 illustrates a specific processing example of the guiding direction vector calculation processing S3 illustrated in FIG. 12.

With this processing example, the guiding target location is first obtained with reference to the data table of the guiding related information 85 determined according to this application or a content to be displayed (S31). Next, a location of the display screen region currently displayed on the display unit 60 (e.g., the center coordinates in the same region) in the display coordinate system is referenced (S32).

Further, a guiding direction vector V at the time of viewing the guiding target location from the current display screen region is obtained from a vector Vc indicating the guiding target location from the origin O, and a vector Vd indicting the center coordinates of the display screen region 62 displayed on the display unit 60 from the origin O (S33).

Figure 21:
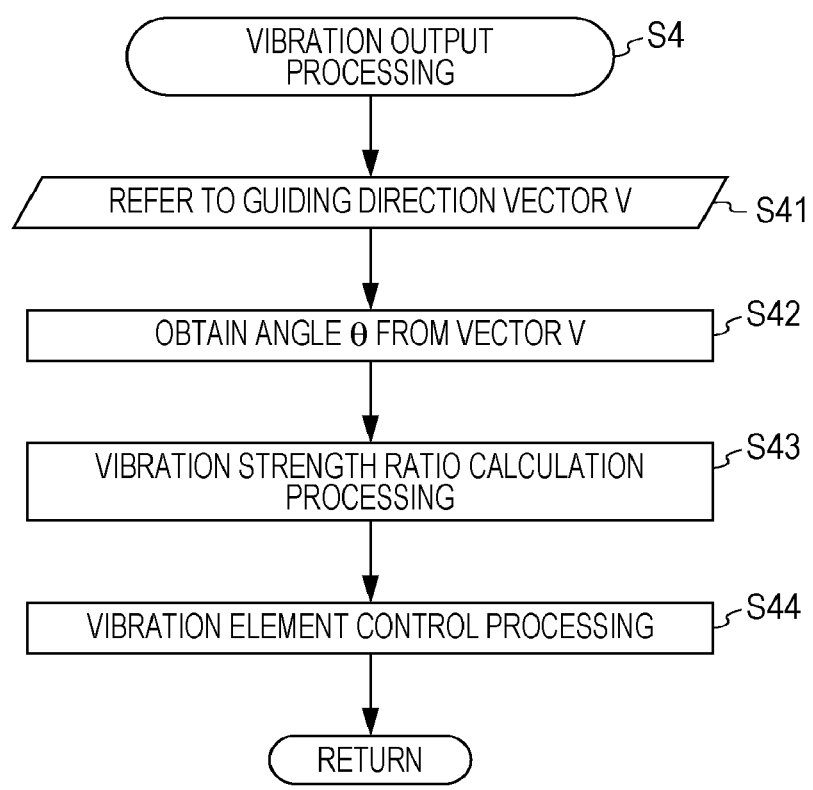
FIG. 21 is a flowchart illustrating a specific processing example of the vibration output processing S4 illustrated in FIG. 12.

FIG. 21 illustrates a specific processing example of the vibration output processing S4 illustrated in FIG. 12.

First, the guiding direction vector V calculated in the above step S33 is referenced (S41). Next, an angle θ is obtained from this vector V (S42). That is to say, the angle θ made up of the vector V, and the lateral axis of the display coordinate system defined at the guiding direction determining unit 12 is obtained.

Next, the vibration strength ratios to be assigned to the four vibration elements respectively are calculated from this angle θ in accordance with the above Expression (1) (S43). Finally, the vibration elements are individually controlled based on these calculated vibration strength ratios (S44).

Figure 22:
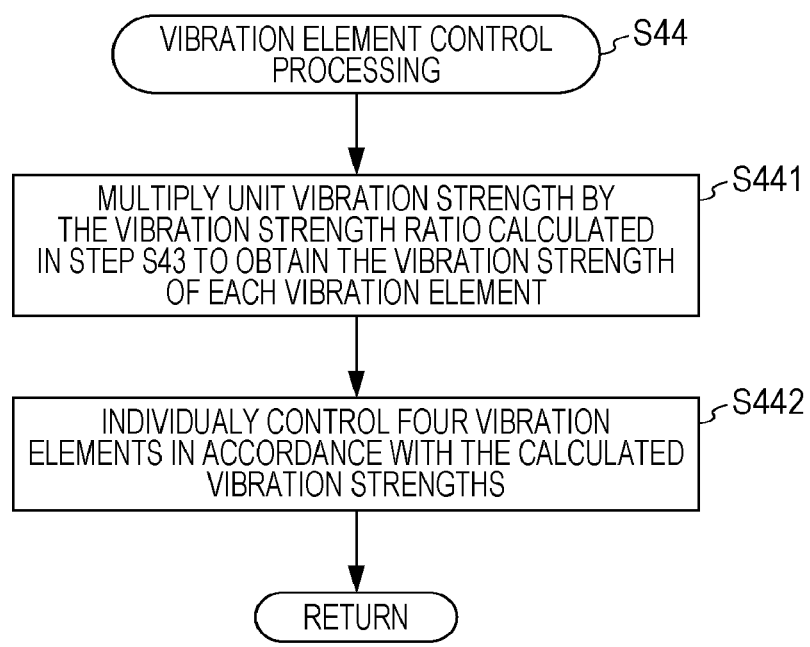
FIG. 22 is a flowchart illustrating a specific processing example of the vibration element control processing S44 illustrated in FIG. 21.

FIG. 22 illustrates a specific processing example of the vibration element control processing S44 illustrated in FIG. 21. With this processing example, first, unit vibration strength is multiplied by the vibration strength ratios calculated in the above step S43 to calculate the vibration strengths of the four vibration elements (S411). Next, the four vibration elements are individually controlled in accordance with these calculated vibration strengths (S442).

Here, the $v1(\theta)$ through $v4(\theta)$ of the above Expression (1) represent the values of mutual ratios (vibration strength ratios) so that the summation of these becomes 1. In reality, each value of the $v1(\theta)$ through $v4(\theta)$ may be multiplied by a common coefficient. For example, the coefficient is changed according to the magnitude of the vector V, whereby the strength of the entire vibration PS itself can be changed.

Figure 23:
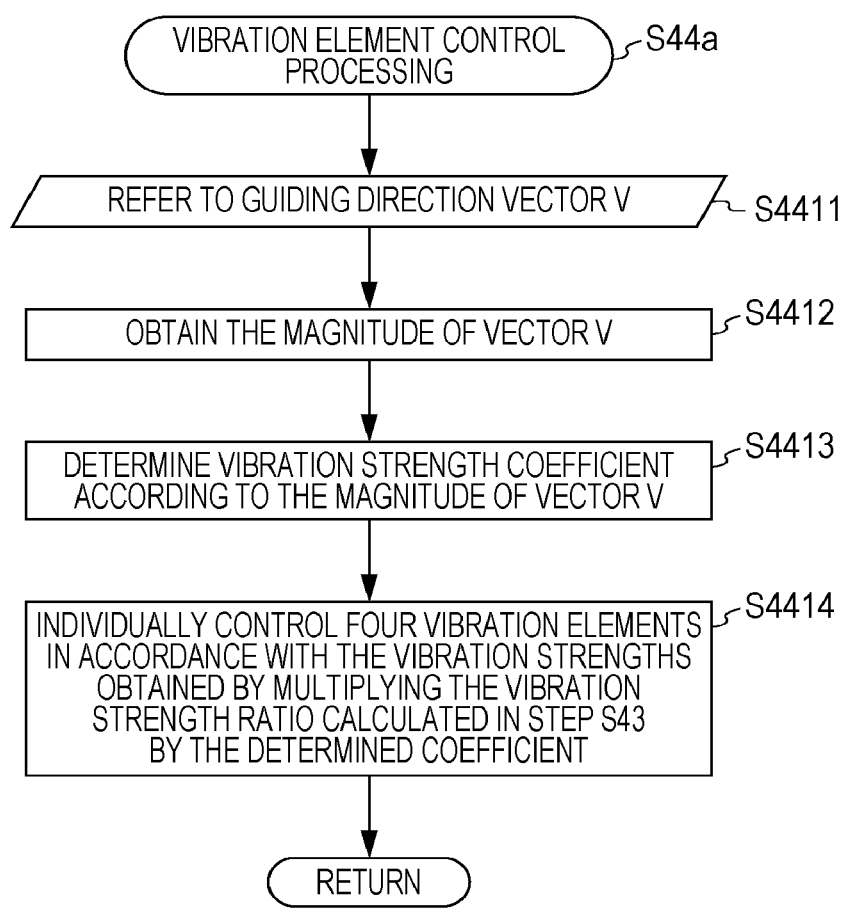
FIG. 23 is a flowchart illustrating a specific processing example of the vibration element control processing S44a serving as a modification of the vibration element control processing illustrated in FIG. 22.

FIG. 23 illustrates a specific processing example of vibration element control processing S44a on which such distance has been reflected as a modification of the vibration element control processing S44 illustrated in FIG. 22.

With this processing example, first, the guiding direction vector V is referenced (S4411), and the magnitude of this vector V is obtained (S4412). The magnitude of this vector V is equivalent to distance from the current display screen region to the guiding target location. Next, a vibration strength coefficient is determined common to the vibration elements according to the obtained magnitude of the vector V (S4413). Next, the four vibration elements are individually controlled according to the vibration strengths obtained by multiplying the vibration strength ratios previously calculated in step S43 by the determined coefficient (S4414).

According to the processing in FIG. 23, not only the guiding direction but also distance to the guiding target within a content can be presented to the user according to the vibration PS.

Figure 24:
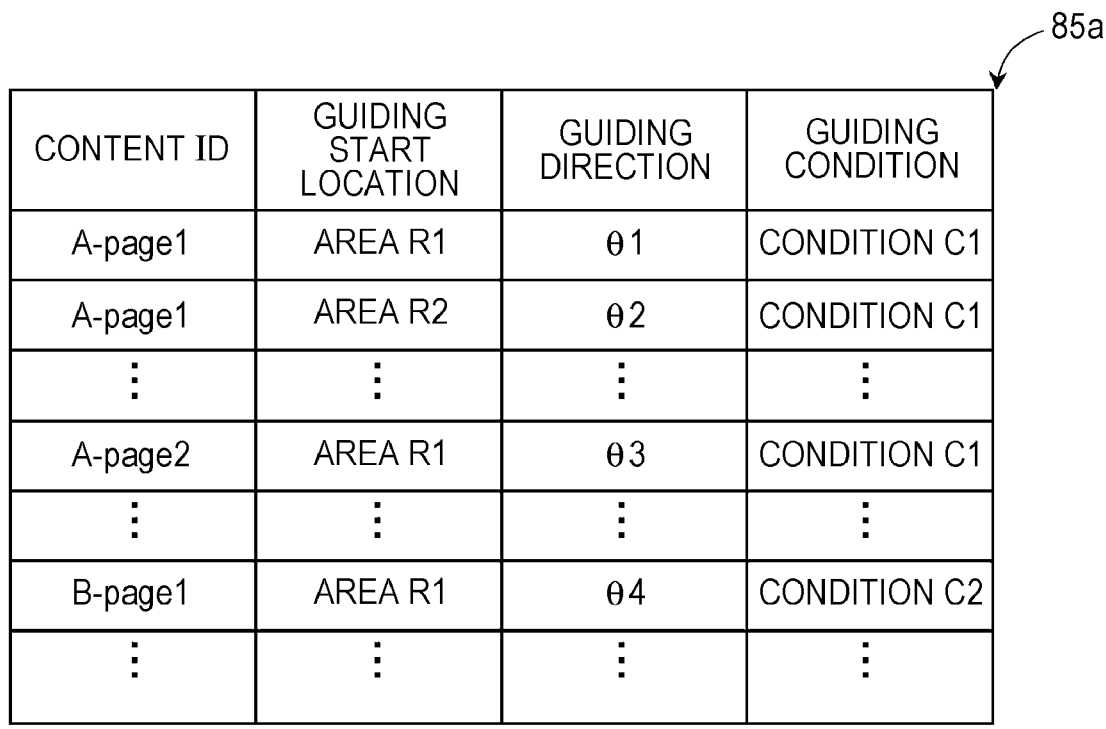
FIG. 24 is a diagram indicating a structure example of a modification of the guiding related information described in FIG. 11.

FIG. 24 illustrates a structure example of guiding related information 85a serving as a modification of the guiding related information 85 described in FIG. 11. The same elements as with the guiding related information 85 in FIG. 11 are denoted with the same names, and redundant description will be omitted. With this structure example, areas R1, R2, and so forth are determined as guiding start locations, and also guiding directions (angles θ1, θ2, θ3, θ4, and so on) are directly specified as to the areas instead of guiding target locations. Accordingly, in the event of employing this guiding related information 85a, the above guiding direction vector calculation processing S3 can be eliminated, and in the vibration output processing S4, the angle θ can directly be derived from the guiding related information 85a. The guiding operation activated at a certain area is updated according to movement to another area defined as a guiding start location. Alternatively, the guiding operation may be ended at another area not defined as a guiding start location. Also, let us say that in the event that a content has been rotated by the user's operation or the like, the guiding start location and guiding direction have been changed as appropriate in accordance with the rotation of the content in the same way as with the guiding related information 85 in FIG. 11.

Next, description will be made regarding an example wherein the above coefficient has been applied to the content 95 having three dimensions or multi hierarchy with reference to FIGS. 25A-25D. Examples of a content having three dimensions or multi hierarchy include a map built with three dimensions, and three-dimensional data in the real world displayed on the screen via a camera used for AR (augmented reality). In the case of the 3D image data illustrated in FIGS. 25A-25C, let us say that the guiding target location is set to the location of a particular building 97, this building 97 exists behind of another building 96. Note that an arrow representing the vector V in the drawing is illustrated for convenience, and is not displayed on the screen.

Figure 25A:
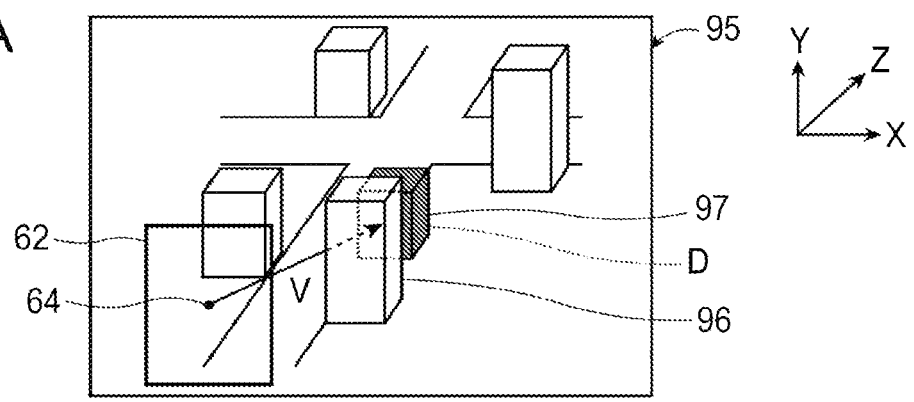
FIGS. 25A-25D describe an example wherein a vibration coefficient is applied to content having three dimensions (3D) or multi hierarchy.
Figure 25B:
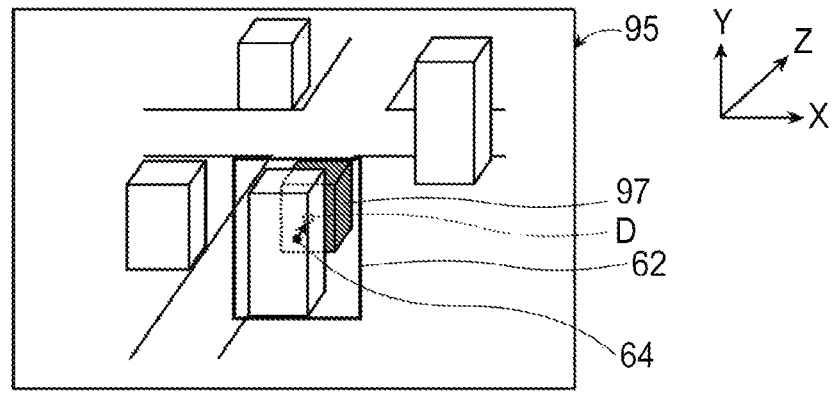
Figure 25C:
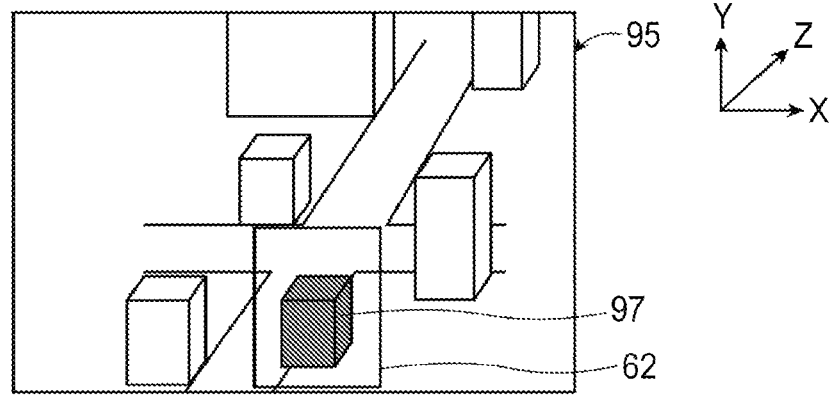
Figure 25D:
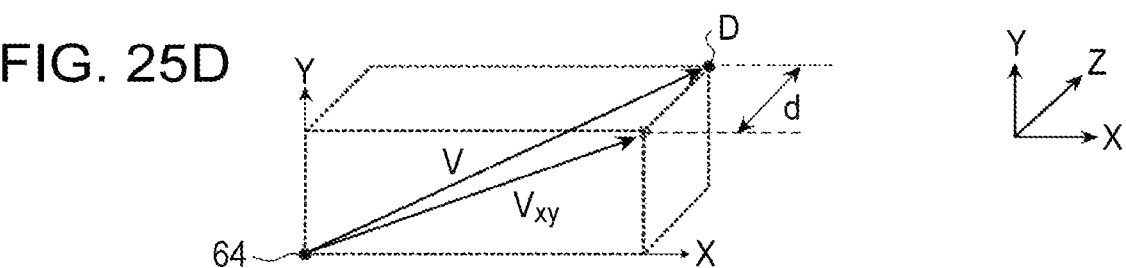

In the case that a content to be presented to the user has three dimensions or multi hierarchy, the above vibration strength coefficient is changed according to the three-dimensional depth (depth) of the guiding target location, or the hierarchy of the content. For example, as illustrated in FIG. 25A, a case is assumed where a part of a 2D image where a 3D content is projected on a particular plane is displayed within the display screen region 62.

Let us say that "particular plane" mentioned here is an imaginary plane (X-Y plane) in which the display screen region 62 of the personal digital assistant in which the user's view point is included is included. Also, let us say that a depth direction perpendicular to this particular plane is taken as the z direction. Here, let us say that the vibration strength coefficient is determined based on distance (depth component) d of the depth from the particular plane to the guiding target location.

The above depth distance can be obtained based on the 3D image data of the content 95, and the location of the current particular plane. This guiding direction vector V is defined within the 3D space, a vector Vxy where this vector V is projected on the X-Y plane is used as a vector indicting the guiding direction.

Also, with regard to the depth direction (Z direction), the location of the particular plane where the current display screen region is located can be changed by the user's operation. For example, there are illustrated a 3D image when scrolling the display image in the opposite direction of the guiding direction from the display state in FIG. 25B, and moving the particular plane where the viewpoint exists to the depth direction, and the location of the display screen region 62 after movement. As can be understood from this drawing, the building 96 in front of the target building 97 has disappeared from the display image.

Such a movement operation in the depth direction by the user can be assisted by change of the strength of the vibration PS based on the vibration strength coefficient.

Figure 26:
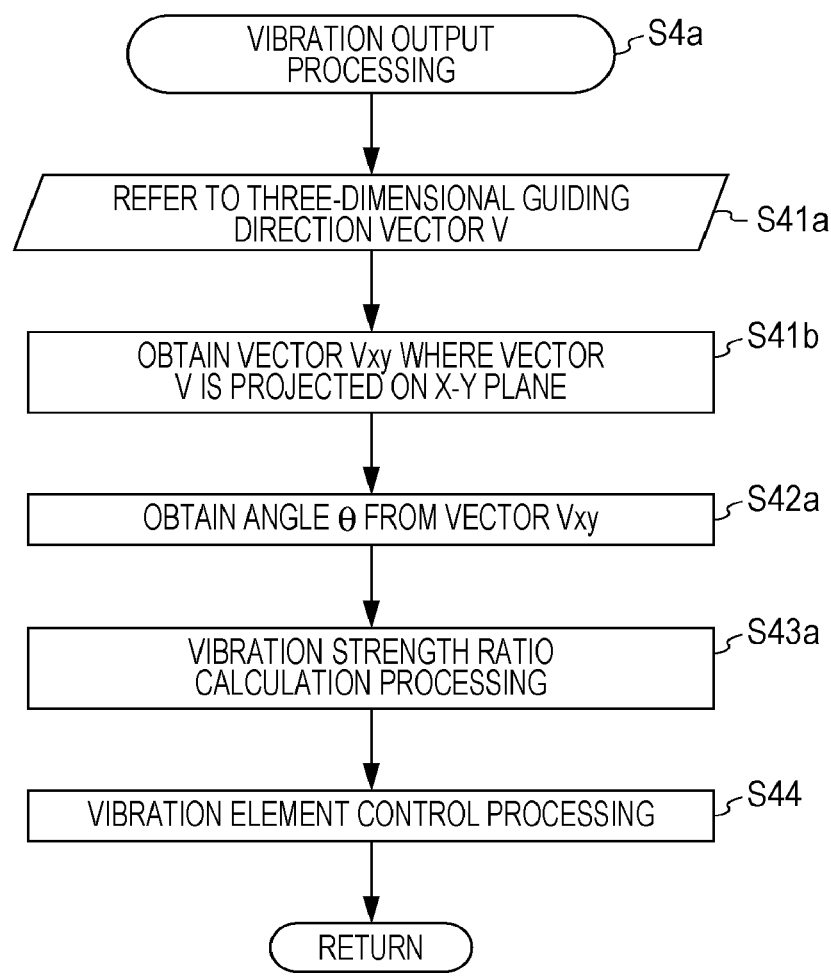
FIG. 26 is a flowchart illustrating vibration output processing S4a serving as a modification of the vibration output processing S4 illustrated in FIG. 21.

With regard to a 3D content, vibration output processing S4a serving as a modification of the vibration output processing S4 illustrated in FIG. 21 is illustrated in FIG. 26.

First, the 3D guiding direction vector V is referenced (S41a). Next, the vector Vxy where this 3D vector V is projected on the X-Y plane is obtained (S41b). Further, the angle θ is obtained from this vector Vxy (S42a).

Next, the vibration strength ratios to be assigned to the four vibration elements are calculated from this angle θ in accordance with the above Expression (1) (S43a). Finally, the vibration elements are individually controlled based on these calculated vibration strength ratios (S44).

Figure 27:
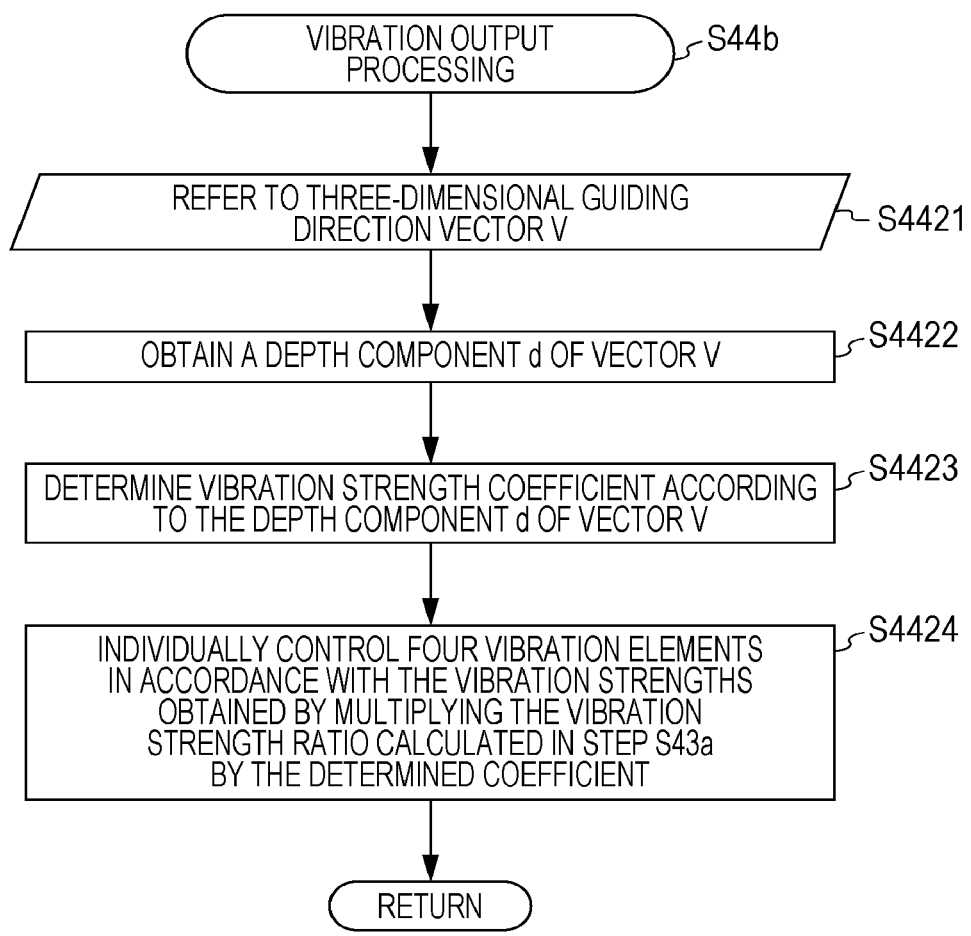
FIG. 27 is a flowchart illustrating a specific processing example of vibration element control processing S44b regarding a 3D content.

FIG. 27 illustrates a specific processing example of vibration element control processing S44b relating to 3D contents.

With this processing example, first, the 3D guiding direction vector V is referenced (S4421). Next, the depth component d of this vector V is obtained (S4422). The vibration strength coefficient is determined common to the vibration elements according to the obtained depth component d of the vector V (S4423). Finally, the four vibration elements are individually controlled in accordance with the vibration strengths obtained by multiplying the vibration strength ratios calculated in step S43a in FIG. 26 by this determined coefficient (S4424).

A case where the vibration frequencies of the vibration elements of the perceptual active unit 70 is fixed has been assumed. However, the vibration frequencies may be variable. For example, in the same way as described above, the vibration frequencies may be changed according to distance to the guiding target within a content, the depth of 3D, the hierarchy of a content, or the like.

As an example of application, the user's browsing can be guided to a direction such as an advertisement which a content producer has installed, or the like above a map built with 3D as an application. That is to say, the location and strength of the vibration SP within the user's palm are changed according to the direction and depth distance thereof. Even in the event that the guiding target is shielded with another object, and cannot be viewed, the direction and depth degree thereof can be presented to the user.

With regard to multi hierarchical 3D data, the number of hierarchies can be employed instead of depth distance.

As described above, according to an embodiment of the present disclosure, with a mode wherein a part of the entire content is displayed on the display screen region, the location to be browsed next is guided from the current location of a content being browsed by the vibration PS, whereby the user can intuitively recognize to which direction reading should proceed next. For example, guiding to a direction for reading a newspaper or comic book, providing of a terminal user guide suitable for aged people, and so forth are available.

Also, this guiding can be realized without increasing the display information amount of a content, nor narrowing a substantial display region, nor depending on visual perception.

With regard to 3D contents, the altitude and depth of the guiding target location are expressed by changing the strength of the entire vibration PS, and guiding of the browsing direction in the 3D space can be performed. For example, it can be conceived that, with AR (augmented reality) such as Sekai Camera (registered trademark) or the like, the direction and depth distance to an AIR tag such as an advertisement disposed above the 3D space are intuitively provided to the user, thereby guiding the user.

With the above embodiment, the following is disclosed (1) An information processing apparatus comprising:
a casing;
a display supported by the casing that displays content;
a processor that determines a direction to browsed next as a guiding direction with a location of the content displayed by the display as a reference location;
a perceptual active element including a plurality of active elements disposed in different locations on or within the casing, wherein
the processor determines a perceptual strength of each of the plurality of active elements based on the guiding direction and controls each of the plurality of active elements based on the perceptual strengths.

(2) The information processing apparatus of (1), wherein the processor determines whether to perform a guiding operation based on a predetermined guiding condition.

(3) The information processing apparatus of any one of (1) to (2), further comprising:
a memory that stores predetermined guiding conditions corresponding to the content.

(4) The information processing apparatus of (3), wherein the processor determines whether to perform a guiding operation based on the predetermined guiding conditions stored in the memory.

(5) The information processing apparatus of any one of (1) to (4), wherein the processor determines the direction to be browsed next by identifying a browsing start location within the content.

(6) The information processing apparatus of (5), further comprising:

a user interface that receives a user input, wherein the processor identifies the browsing start location based on a user input received at the user interface.

(7) The information processing apparatus of (5), wherein the processor identifies the browsing start location based on information accompanying the content.

(8) The information processing apparatus of any one of (1) to (7), wherein the processor determines whether a guiding start location of the content is displayed on the display.

(9) The information processing apparatus of (8), wherein the processor determines to perform a guiding operation when it is determined that the guiding start location of the content is displayed on the display.

(10) The information processing apparatus of any one of (1) to (9), wherein the processor identifies a guiding target location within the content.

(11) The information processing apparatus of (10), wherein the processor identifies the guiding target location based on information accompanying the content.

(12) The information processing apparatus of (10), wherein the guiding target location within the content identified by the processor is a location within the content that is not displayed by the display.

(13) The information processing apparatus of (10), wherein the processor determines the direction to be browsed next based on the identified target location within the content.

(14) The information processing apparatus of any one of (1) to (13), wherein the processor determines whether to perform a guiding operation based on an initial setting regarding whether to perform the guiding operation.

(15) The information processing apparatus of any one of (1) to (14), further comprising:

a user interface configured to receive a user setting as to whether to perform a guiding operation, wherein the processor determines whether to perform the guiding operation based on the user input.

(16) The information processing apparatus of any one of (1) to (15), wherein the displayed content corresponds to at least one of newspaper content, map content, three-dimensional content and multi-layered content.

(17) The information processing apparatus of any one of (1) to (16), wherein the plurality of active elements are at least one of vibration elements, heating elements, contraction elements, and electrical stimulation elements.

(18) The information processing apparatus of any one of (1) to (17), wherein the perceptual active element includes at least three active elements disposed in different locations on or within the casing.

(19) An information processing method performed by an information processing apparatus, the method comprising:

determining a direction to browsed next as a guiding direction with a location of content displayed by a display of the information processing apparatus as a reference location;

determining a perceptual strength of each of a plurality of active elements disposed in different locations on or within a casing of the information processing apparatus based on the guiding direction; and controlling each of the plurality of active elements based on the perceptual strengths.

(20) A non-transitory computer-readable medium including computer program instructions, which when executed by an information processing apparatus, cause the information processing apparatus to perform a method comprising:

determining a direction to browsed next as a guiding direction with a location of content displayed by a display of the information processing apparatus as a reference location;

determining a perceptual strength of each of a plurality of active elements disposed in different locations on or within a casing of the information processing apparatus based on the guiding direction; and controlling each of the plurality of active elements based on the perceptual strengths.

Though description has been made so far regarding the suitable embodiment of the present disclosure, various modifications and changes other than the above mentioned can be made. Specifically, it is apparent that one skilled in the art can conceive various modifications, combinations, and other embodiments due to a design or other elements within the scope of the Claims of the present disclosure or equivalent to the Claims.

For example, though description has been made regarding the personal digital assistant performing control of the vibration PS according to four-point vibration according to the four vibration elements, control of the vibration PS according to a number of vibrations other than four points can be performed by changing a vibration strength ratio calculating algorithm (formula). In the case of 3-point vibration, there are restrictions such as difficulty of control of the vibration PS due to that there are a few vibrators, and difficulty of effective vibrator layout in terms of a functional aspect and a design aspect. However, the vibrators are disposed in a triangle shape, and the vibration strength control algorithm is adjusted, whereby the direction of the target terminal can be presented by presenting the vibration PS above a 2D plane in the same way as with a case of employing 4-point vibration, though precision and effective aspects somewhat deteriorate.

Though description has been made regarding the vibration elements as an example of the active elements of the perceptual active unit, the vibration elements may be replaced or reinforced with other active elements such as heating elements, contraction elements, or electrical stimulation elements whereby the level of sense to be perceived can be controlled. The heating elements are sensitive to an electric current to generate heat in a scattered manner so as to instruct the user in a particular direction. For example, the user can perceive that two elements substantially generate more heat than other two elements. The ratio of the amount of heat perceived from these elements is a perceptual clue for the user regarding the direction of the guiding direction vector V. As another example, the guiding direction vector may be perceived by the user who put on gloves including pressure restrictive transducers, or other clothing accessories. The pressure restrictive transducers in this case squeeze or tingle the fingers or wrists or the like as a perceptual clue as to the target guiding direction. For example, in the event of employing gloves described in U.S. Pat. No. 5,067,478 (the entire contents thereof are encompassed in the present application by reference), the gloves can readily be used for assisting the present function.

End of the guiding operation may be that the guiding operation is ended after elapse of predetermined period of time since start of the guiding operation, other than the above mentioned way.

A computer program for realizing the functions described in the above embodiment at a computer, and a recording medium which stores the program in a computer-readable manner are also encompassed in the present disclosure. Examples of "recording medium" for supplying the program include magnetic storage media (flexible disks, hard disks, magnetic tapes, etc.), optical discs (magneto-optical disk such as MO or PD or the like, CD, DVD, etc.), and semiconductor storages.

The invention claimed is:

1. An information processing apparatus, comprising:
a casing;
a display supported by the casing that displays a first portion of content within a display region;
a plurality of active elements disposed at different locations on or within the casing; and
a processor that
determines a guiding direction from a location of the first portion of the content displayed in the display region to a second location of a second portion of the content, the second portion of the content being outside of the display region;
determines a perceptual strength of each active element of the plurality of active elements based on the guiding direction; and
controls activation of the plurality of active elements based on the perceptual strengths so as to provide an active indication of the guiding direction towards the second location, wherein
the processor determines the guiding direction based on a first vector and a second vector,
the first vector being from a third location of the content to a second location,
the second vector being from the third location to the first location; and
the third location is outside of the first portion and the second portion.

2. The information processing apparatus of claim 1, wherein the processor determines whether to perform a guiding operation based on a predetermined guiding condition.

3. The information processing apparatus of claim 1, further comprising a memory that stores predetermined guiding conditions corresponding to the content.

4. The information processing apparatus of claim 3, wherein the processor determines whether to perform a guiding operation based on the predetermined guiding conditions stored in the memory.

5. The information processing apparatus of claim 1, wherein the processor determines the guiding direction by identifying a browsing start location within the content.

6. The information processing apparatus of claim 5, further comprising:
a user interface that receives a user input, wherein
the processor identifies the browsing start location based on a user input received at the user interface.

7. The information processing apparatus of claim 5, wherein the processor identifies the browsing start location based on information accompanying the content.

8. The information processing apparatus of claim 1, wherein the processor determines whether a guiding start location of the content is displayed on the display.

9. The information processing apparatus of claim 8, wherein the processor determines to perform a guiding operation in response to determining that the guiding start location of the content is displayed on the display.

10. The information processing apparatus of claim 1, wherein the processor identifies a guiding target location within the content.

11. The information processing apparatus of claim 10, wherein the processor identifies the guiding target location based on information accompanying the content.

12. The information processing apparatus of claim 10, wherein the guiding target location within the content identified by the processor is a location within the second portion of the content outside of the display region.

13. The information processing apparatus of claim 10, wherein the processor determines the guiding target location within the content based on the identified target location within the content.

14. The information processing apparatus of claim 1, wherein the processor determines whether to perform a guiding operation based on an initial setting regarding whether to perform the guiding operation.

15. The information processing apparatus of claim 1, further comprising:
a user interface configured to receive a user setting as to whether to perform a guiding operation, wherein
the processor determines whether to perform the guiding operation based on the user input.

16. The information processing apparatus of claim 1, wherein the displayed content corresponds to at least one of newspaper content, map content, three-dimensional content and multi-layered content.

17. The information processing apparatus of claim 1, wherein the plurality of active elements are at least one of vibration elements, heating elements, contraction elements, and electrical stimulation elements.

18. The information processing apparatus of claim 1, wherein the perceptual active element includes at least three active elements disposed in different locations on or within the casing.

19. An information processing method performed by an information processing apparatus that includes a casing, a display and a plurality of active elements that are disposed at different locations on or within the casing, the method comprising:
controlling the display to display a first portion of content within a display region;
determining a guiding direction from a location of the first portion of the content displayed in the display region to a second location of a second portion of the content, the second portion of the content being outside of the display region;
determining a perceptual strength of each active element of the plurality of active elements based on the guiding direction; and
controlling activation of the plurality of active elements based on the perceptual strengths so as to provide an active indication of the guiding direction towards the second location, wherein
the guiding direction is determined based on a first vector and a second vector, the first vector being from a third location of the content to a second location, the second vector being from the third location to the first location, and the third location is outside of the first portion and the second portion.

20. A non-transitory computer-readable medium including computer program instructions, which when executed by an information processing apparatus that includes a casing, a display and a plurality of active elements that are disposed at different locations on or within the casing, cause the information processing apparatus to perform a method comprising:

controlling the display to display a first portion of content within a display region;

determining a guiding direction from a location of the first portion of the content displayed in the display region to a second location of a second portion of the content, the second portion of the content being outside of the display region;

determining a perceptual strength of each active element of the plurality of active elements based on the guiding direction; and controlling activation of the plurality of active elements based on the perceptual strengths so as to provide an active indication of the guiding direction towards the second location, wherein the guiding direction k determined based on a first vector and a second vector, the first vector being from a third location of the content to a second location, the second vector being from the third location to the first location, and the third location is outside of the first portion and the second portion.

* * * * *